United States Patent
Mehrvar

(10) Patent No.: US 10,841,671 B1
(45) Date of Patent: Nov. 17, 2020

(54) METHOD AND APPARATUS FOR LOSS-AWARE OPTICAL ROUTING

(71) Applicant: Hamid Mehrvar, Ottawa (CA)

(72) Inventor: Hamid Mehrvar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/405,773

(22) Filed: May 7, 2019

(51) Int. Cl.
   *H04J 14/00* (2006.01)
   *H04Q 11/00* (2006.01)
   *H04J 14/02* (2006.01)

(52) U.S. Cl.
   CPC ...... *H04Q 11/0005* (2013.01); *H04J 14/0212* (2013.01); *H04Q 11/0062* (2013.01); *H04Q 2011/0026* (2013.01); *H04Q 2011/0073* (2013.01)

(58) Field of Classification Search
   CPC ........... H04Q 11/0062; H04Q 11/0066; H04Q 11/0067; H04Q 11/0003; H04Q 11/0005; H04J 14/02; H04J 14/0212; H04L 49/25; H04L 45/62; G02B 6/356; G02B 6/3567; G02B 6/3546
   USPC ........ 398/45, 46, 47, 48, 49, 50, 51, 53, 55, 398/56, 57, 79, 33, 38, 54, 83; 385/24, 385/16, 17, 18
   See application file for complete search history.

(56) References Cited

U.S. PATENT DOCUMENTS

| | | | |
|---|---|---|---|
| 9,207,404 B2 | 12/2015 | Miglani et al. | |
| 9,602,432 B2 * | 3/2017 | Lee | H04L 49/10 |
| 10,244,296 B1 * | 3/2019 | Dupuis | H04Q 11/0062 |
| 2007/0098321 A1 * | 5/2007 | Oikawa | G02B 6/122 |
| | | | 385/18 |
| 2014/0328154 A1 * | 11/2014 | Mehrvar | H04L 49/25 |
| | | | 370/201 |

FOREIGN PATENT DOCUMENTS

| | | |
|---|---|---|
| CN | 103973369 A | 8/2014 |
| CN | 104094611 A | 10/2014 |

(Continued)

OTHER PUBLICATIONS

Yangjin Ma et al., "Ultralow loss single layer submicron silicon waveguide crossing for SOI optical interconnect," Opt. Express 21, 29374-29382 (2013).

(Continued)

*Primary Examiner* — Hanh Phan

(57) ABSTRACT

A method and apparatus for operating an optical switching fabric or other optical device are provided. The device has multiple input and output ports to be selectably connected together via optical paths. For a requested configuration, an optical device configuration is determined based on a loss metric, which is based on one or both of: a number of crossings of the optical paths; and a length of the optical paths. The crossings can be waveguide crossings within the switching fabric. The configuration can be obtained by selecting particular intermediate stages of the switching fabric for carrying particular optical paths. The number of waveguide crossings, or the variation in the number of waveguide crossings, can be limited or minimized in the selected configuration. In one embodiment, an initial solution is determined, and the intermediate stages of the switch are re-ordered to obtain an improved solution in terms of the loss metric.

22 Claims, 16 Drawing Sheets

(56) References Cited

FOREIGN PATENT DOCUMENTS

| CN | 106603405 A | 4/2017 |
|---|---|---|
| CN | 106899508 A | 6/2017 |

OTHER PUBLICATIONS

H. Mehrvar and E. Bernier, "Fast Photonic Switch Architecture for Interconnect Applications," European Conference on Optical Communication, Sep. 2018.

* cited by examiner

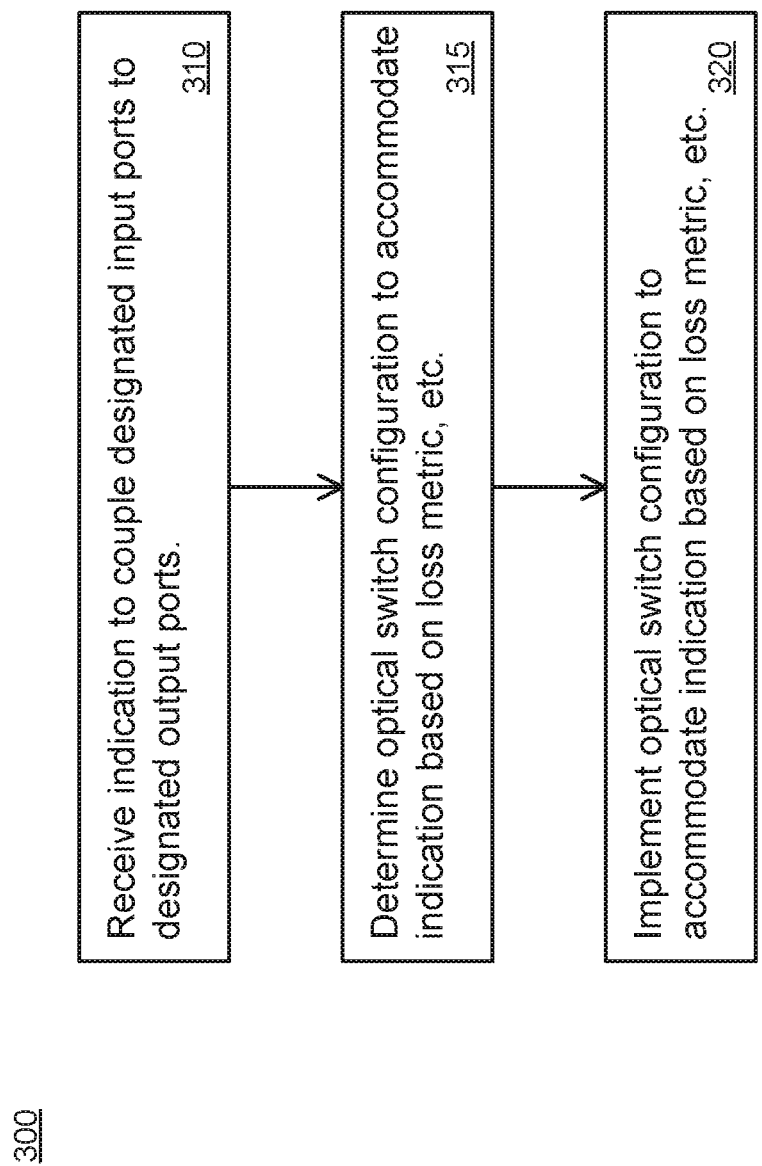

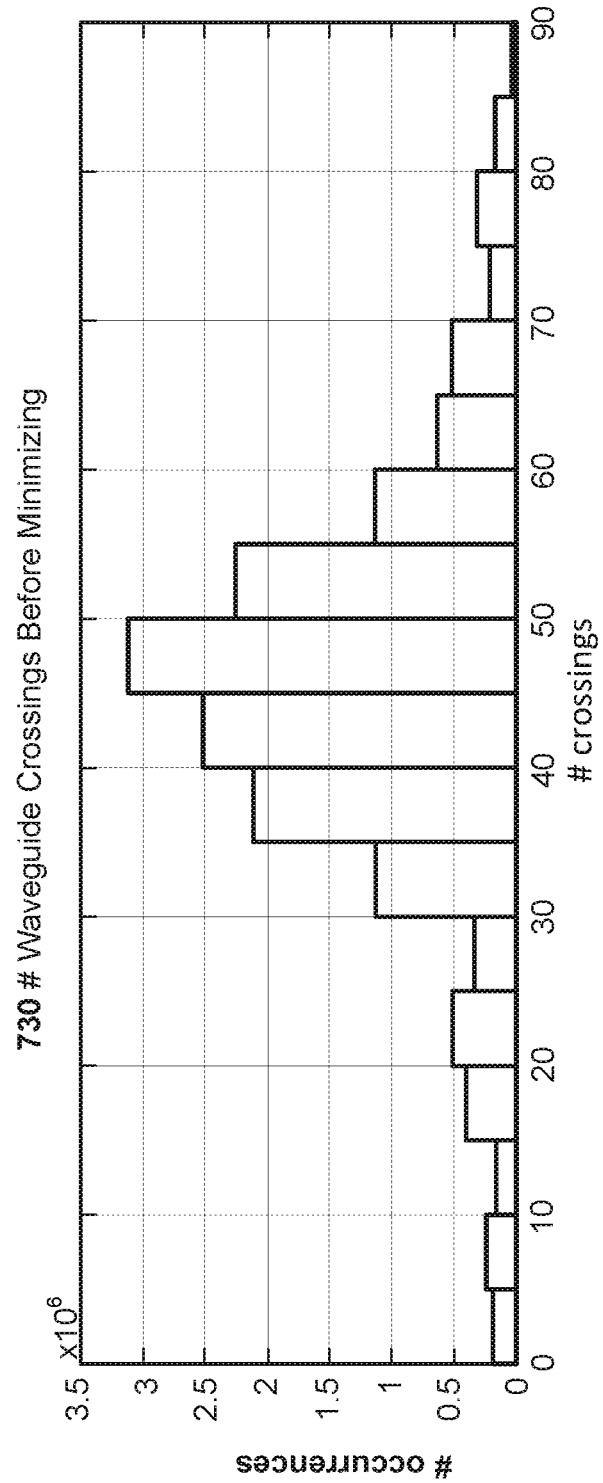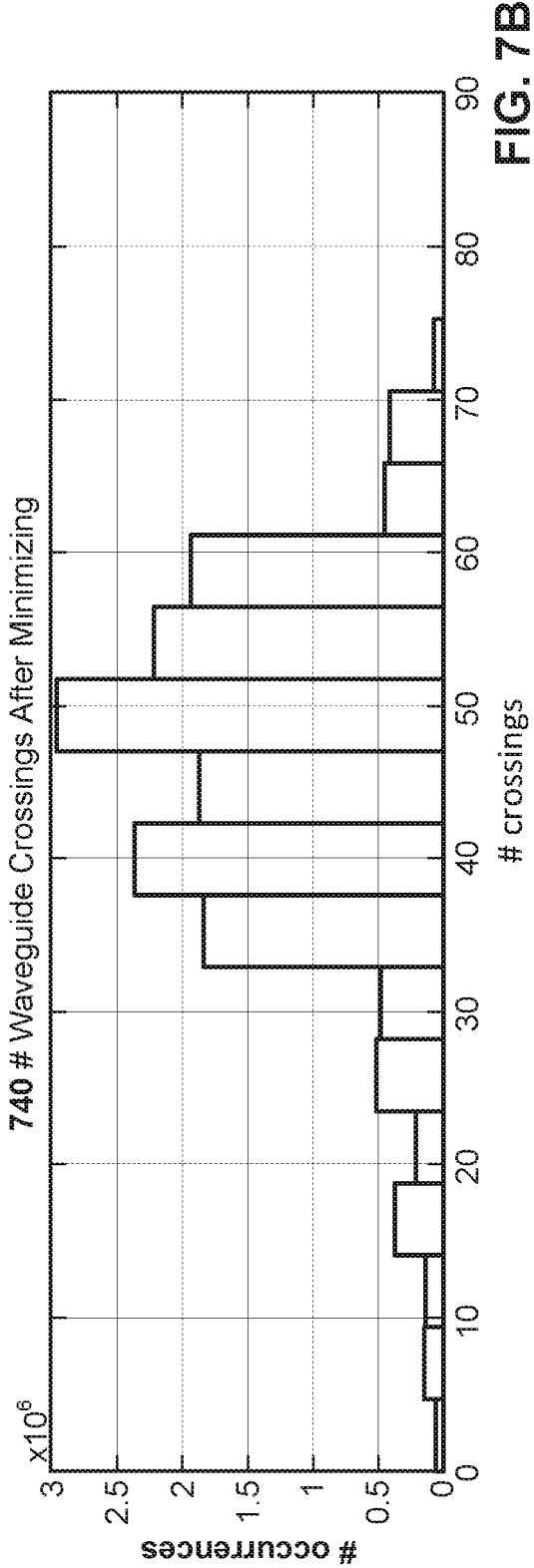
FIG. 7B

METHOD AND APPARATUS FOR LOSS-AWARE OPTICAL ROUTING

FIELD OF THE INVENTION

The present invention pertains to the field of optical devices and in particular to a method and apparatus for optical routing in a device such as but not necessarily limited to an optical switching fabric having a re-arrangably non-blocking characteristic, the routing accounting for loss characteristics such as number of optical path crossings or optical path lengths.

BACKGROUND

An N×N silicon photonic switch includes multiple interconnected switching elements, such as 2×2 Mach-Zehnder switching element, arranged into multiple stages. The elements of each stage are interconnected to the previous or next stage by waveguides. Currently, silicon photonic switches are primarily implemented in a single-layer lithographic structure. As such, the inter-connecting waveguides must either cross each other in the same plane or be vertically separated by a small distance. Such waveguide crossings contribute to insertion loss of the switch. This is because the loss from an input of the switch to an output of the switch depends on input/output coupling loss, number of switching elements in the switch's internal connection path, total number of waveguide crossings along the connection path, and total waveguide length of the connection path. Different paths between the same switch input and output, as well as between different switch inputs and outputs, can have different total losses. This leads to variability in the switch's insertion loss. Such variability is undesirable as it leads to different and possibly unpredictable loss characteristics for different switch configurations. This can lead to implementations that factor in a 'worst-case' insertion loss for the switch, which is sub-optimal.

It is further considered that other devices, such as wavelength selective switches (WSS) can also suffer from similar insertion loss variability, due to confined or unconfined optical paths crossing closely together or being variable in length.

Therefore, there is a need for a method and apparatus for optical path routing, in an optical switching fabric or other device, that mitigates insertion loss variability, or that otherwise obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for loss-aware optical routing. In accordance with embodiments of the present disclosure, a method for operating an optical switching fabric is provided. The optical switching fabric has a plurality of input ports, a plurality of output ports, and a plurality of photonic elements operable to selectably optically couple the input ports to the output ports. The method includes receiving an indication to optically couple each designated one of a set of the input ports to a designated one of a set of the output ports. The method includes, in response to the indication, implement an optical switch configuration which establishes a set of optical paths accommodating the indication. The optical switch configuration is determined based at least in part on a loss metric. The loss metric in turn is based on one or both of: a number of waveguide crossings in each of the optical paths; and a length of each of the optical paths.

In accordance with embodiments of the present disclosure, a method for operating an optical device is provided. The optical device has a plurality of input ports, a plurality of output ports, and a plurality of elements operable to selectably optically couple the input ports to the output ports, via confined or unconfined optical paths. The method includes receiving an indication to optically couple each designated one of a set of the input ports to a designated one of a set of the output ports. The method includes, in response to the indication, implementing an optical device configuration which establishes a set of optical paths accommodating the indication. The optical device configuration is determined based at least in part on a loss metric. The loss metric in turn is based on one or both of: a number of crossings or near crossings in each of the optical paths; and a length of each of the optical paths.

In accordance with embodiments of the present disclosure, an optical switch (or at least the controller thereof) is provided. The optical switch includes an optical switching fabric having a plurality of input ports, a plurality of output ports, and a plurality of photonic elements operable to selectably optically couple the input ports to the output ports. The controller may include a computer processor executing instructions stored in memory, or other suitable electronics for determining and implementing switch states, and switch driving electronics for driving the photonic elements accordingly. The controller is configured to switchably operate the plurality of photonic elements in response to input indicative of a desired state of the optical switch. The controller is further configured to receive an input to optically couple each designated one of a set of the input ports to a designated one of a set of the output ports. The controller is further configured, in response to the indication, to implement an optical switch configuration which establishes a set of optical paths accommodating the indication. The optical switch configuration is determined, by the controller, based at least in part on a loss metric. The loss metric is based on one or both of: a number of waveguide crossings in each of the optical paths; and a length of each of the optical paths.

In accordance with embodiments of the present disclosure, an optical device (or at least the controller thereof) is provided. The optical device may be an optical switch as above, or a wavelength selective switch, or another optical device. The optical device includes an optical path component having a plurality of input ports, a plurality of output ports, and a plurality of elements operable to selectably optically couple the input ports to the output ports. The controller may include a computer processor executing instructions stored in memory, or other suitable electronics for determining and implementing device states, and device driving electronics for driving the device's elements accordingly. The controller is configured to switchably operate the plurality of elements in response to input indicative of a desired state of the optical path component. The controller is further configured to receive an input to optically couple each designated one of a set of the input ports to a designated one of a set of the output ports. The controller is further configured, in response to the indication, to implement an optical path component configuration which establishes a set of optical paths accommodating the indication. The optical path component configuration is determined, by the controller, based at least in part on a loss metric. The loss metric is based on one or both of: a number of crossings or near crossings in each of the optical paths; and a length of each of the optical paths.

BRIEF DESCRIPTION OF THE FIGURES

Further features and advantages of the present disclosure will become apparent from the following detailed description, taken in combination with the appended drawings, in which:

FIG. 3 illustrates a method for operating an optical switching fabric, according to embodiments of the present disclosure.

FIG. 7B illustrates performance improvement for the switching fabric of FIG. 1A for a different loss metric, obtained for embodiments of the present disclosure via simulation.

It will be noted that throughout the appended drawings, like features are identified by like reference numerals.

DETAILED DESCRIPTION

Figure 1A:
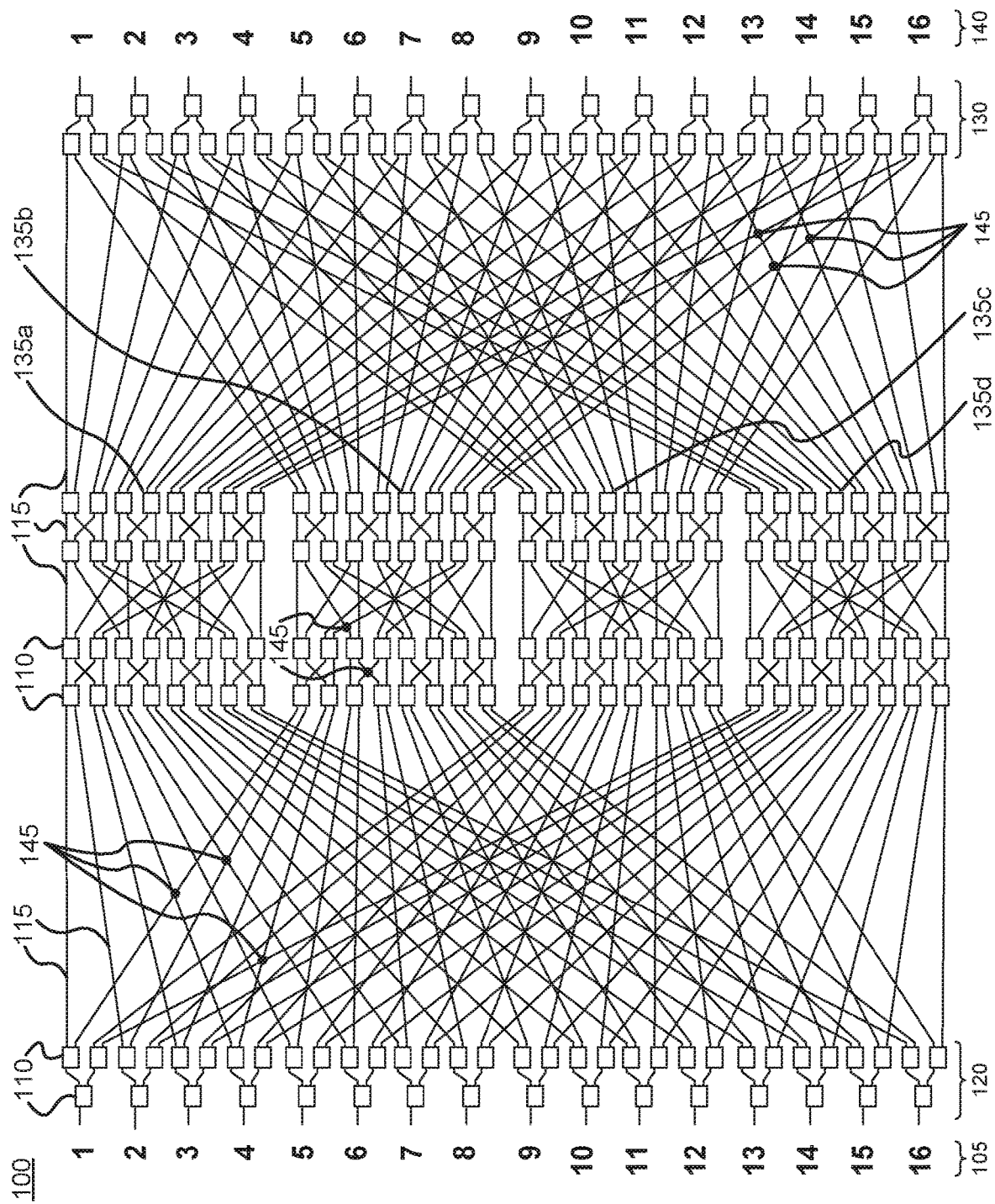
FIG. 1A illustrates an example multiplane optical switching fabric provided according to or operable with embodiments of the present disclosure.

Embodiments of the disclosure account for numbers of optical path crossings and/or optical path lengths during determination of an optical path routing solution in an optical device. A requirement to optically couple one or more designated input ports to one or more corresponding designated output ports can be satisfied by multiple different routing solutions. Out of the multiple routing solutions, one selected solution is implemented which exhibits a limited or minimum contribution of optical loss due to path crossings, path lengths, or a combination thereof. For example, the effect of waveguide crossing loss in the connection insertion loss can be minimized. Thus, routing such as non-blocking routing in an optical switch is performed with the additional step of limiting or minimizing a loss metric.

The route determination process of embodiments of the present disclosure can account for optical path crossing loss, optical path length, or both. Furthermore, the route determination process can attempt to limit or minimize such loss contributions, as measured by an appropriate loss metric. This tends to cause reduced variation in these loss contributions among all the multiple connections of the optical device. The route determination process can attempt to limit or minimize loss along each path being implemented, which indirectly tends to limit or minimize loss variability among all paths. The route determination process can alternatively attempt to directly limit or minimize loss variation among all paths, for example by minimizing a difference between maximum and minimum losses over all paths. The route determination process can alternatively attempt to minimize a maximum path loss or an average path loss.

Embodiments of the disclosure are applicable to a partially or fully loaded optical switching fabric (connection matrix) or other optical (photonic) device optically connecting input ports to output ports. In particular, embodiments of the present disclosure limit or minimize variations in the optical device's insertion loss, in particular due to factors such as number of optical crossings and/or optical path length. Such variation arises inherently due to the different number of waveguide crossings along different paths through the optical device.

Embodiments of the disclosure can be implemented without impacting the connection blocking performance of the optical device. Non-blocking routing is performed, and the non-blocking routes are then re-arranged to minimize or limit certain losses. Path-finding (routing) time and crosstalk performance may also be unimpacted or minimally impacted. The method and apparatus are applicable to a variety of optical switch architectures, such as multi-plane (e.g. modular quad as in FIG. 1A) and recursively dual-plane architectures (e.g. Benes, Dilated Benes, Hybrid Dilated Banyan, and Hybrid Dilated Benes Enhanced (HDBE)). The present disclosure was purposefully developed so as not to impact or minimally impact these performance aspects.

FIG. 1A illustrates an example multiplane switching fabric 100 which may be the subject of certain embodiments of the present disclosure. This switching fabric is described in more detail in H. Mehrvar and E. Bernier, "Fast Photonic Switch Architecture for Interconnect Applications," European Conference on Optical Communication, September 2018, which is incorporated herein by reference. Other applicable switching fabrics include dilated Banyan, Benes, and Hybrid Dilated Benes.

Multiplane switching fabrics can be characterized in that they include an input stage, an output stage, and multiple intermediate stages. The input stage is configured to optically couple selected ones of the input ports to selected ones of the intermediate stages, and the output stage is configured to optically couple selected ones of the intermediate stages to selected ones of the output ports. The use of multiple intermediate stages improves the non-blocking characteristic of the switch. It is noted that the intermediate stages, being coupled to all the ports of the input and output stages, and being structurally similar, functionally similar, or both, are substantially interchangeable. That is, given a routing solution through the switching fabric, a different routing solution can be obtained by interchanging the roles of the intermediate stages.

For example, in a routing solution, a first one or more optical paths pass through a first intermediate stage, and a second one or more optical paths pass through a second intermediate stage. The different routing solution can be obtained by re-ordering the intermediate stages, for example including causing the first one or more optical paths to instead pass through the second (or another) intermediate stage, and causing the second one or more optical paths to instead pass through the first (or yet another) intermediate stage.

The switching fabric 100 of FIG. 1A, as well as a variety of other switching fabrics, includes a plurality of input ports 105 and a plurality of output ports 140. The input and output ports can be connected to external optical carriers such as optical fiber or waveguides. Internally, the switching fabric 100 comprises a plurality of controllable switching cells 110, which include two-input, two-output (2×2) switching cells, and typically also one-input, two-output (1×2) and two-input, one-output (2×1) switching cells. The switching cells are examples of photonic elements. Switching cells can be designed and operated based on Mach-Zehnder interferometry principles, for example, as would be readily understood by a worker skilled in the art. The switching cells 110 are interconnected via waveguides 115 in a particular manner, resulting in a particular switch topology. In operation, light enters an input port and is routed through a selected path by operation of the switching cells to an output port. The path includes a subset of the switching cells 110 and interconnecting waveguides 115. Thus, input ports are selectably optically coupled to output ports. Also illustrated are the input stage 120, the output stage 130, and a plurality of intermediate stages 135a, 135b, 135c, 135d.

FIG. 1A (and similar figures disclosed herein) corresponds to a physical layout of the switching fabric, which is substantially located in a single plane. Notably, in the optical switching fabric 100, the waveguides 115 cross one another at multiple locations as is evident from the figure. Several selected waveguide crossings 145 are highlighted for clarity.

Figure 1B:
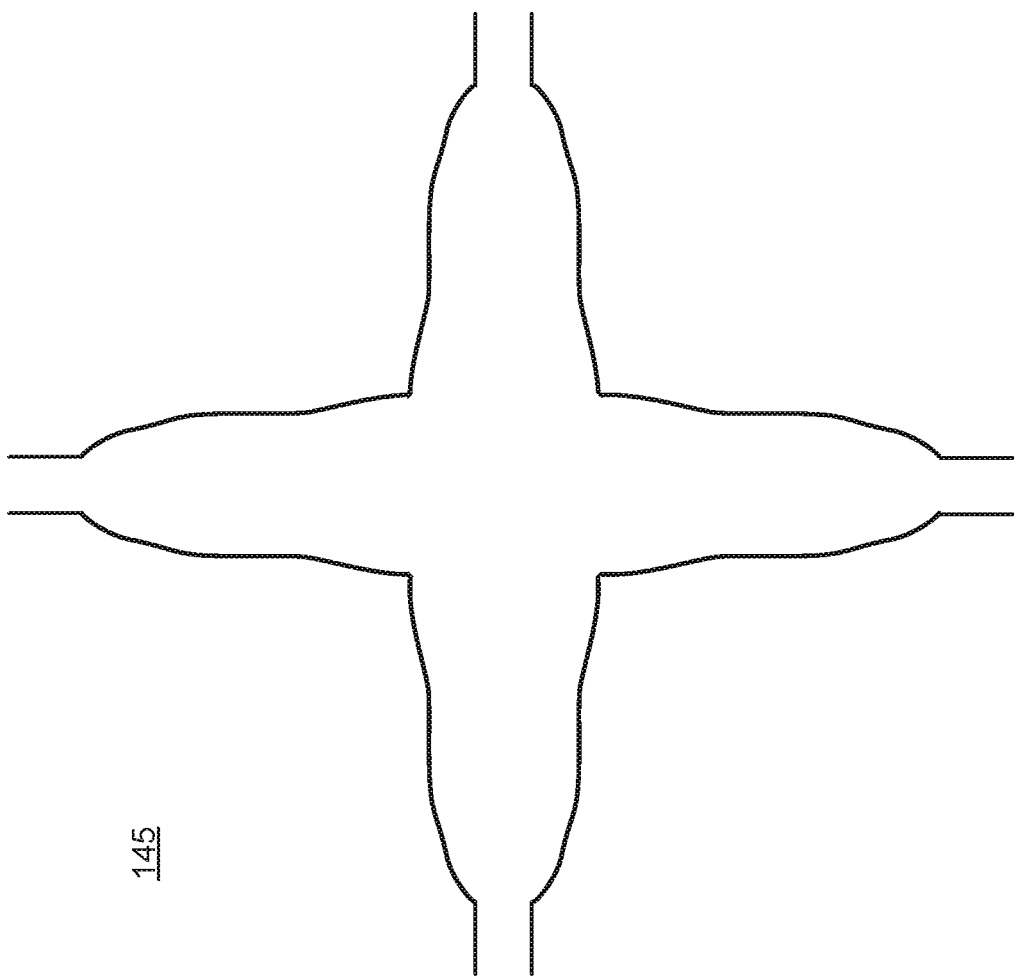
FIG. 1B illustrates a representative waveguide crossing of a switching fabric.

FIG. 1B illustrates a representative waveguide crossing 145 in more detail, as it appears in some embodiments. As illustrated, the waveguide crossing 145 comprises two coplanar waveguides which cross one another. The crossing can be configured for example as described in Yangjin Ma et al., "Ultralow loss single layer submicron silicon waveguide crossing for SOI optical interconnect," Opt. Express 21, 29374-29382 (2013). In this example, the region of the crossing, the waveguides are tapered according to a certain predetermined shape which mitigates crosstalk. However, crosstalk is not altogether eliminated in such crossings. As such, the present invention can be implemented to further mitigate crosstalk. Other approaches to configuring waveguide crossings can also be implemented, for example as described in the references in the above-cited document. In some embodiments, the waveguide crossing can include two waveguides crossing each other in two planes, one of which is layered overtop of the other.

Figure 2:
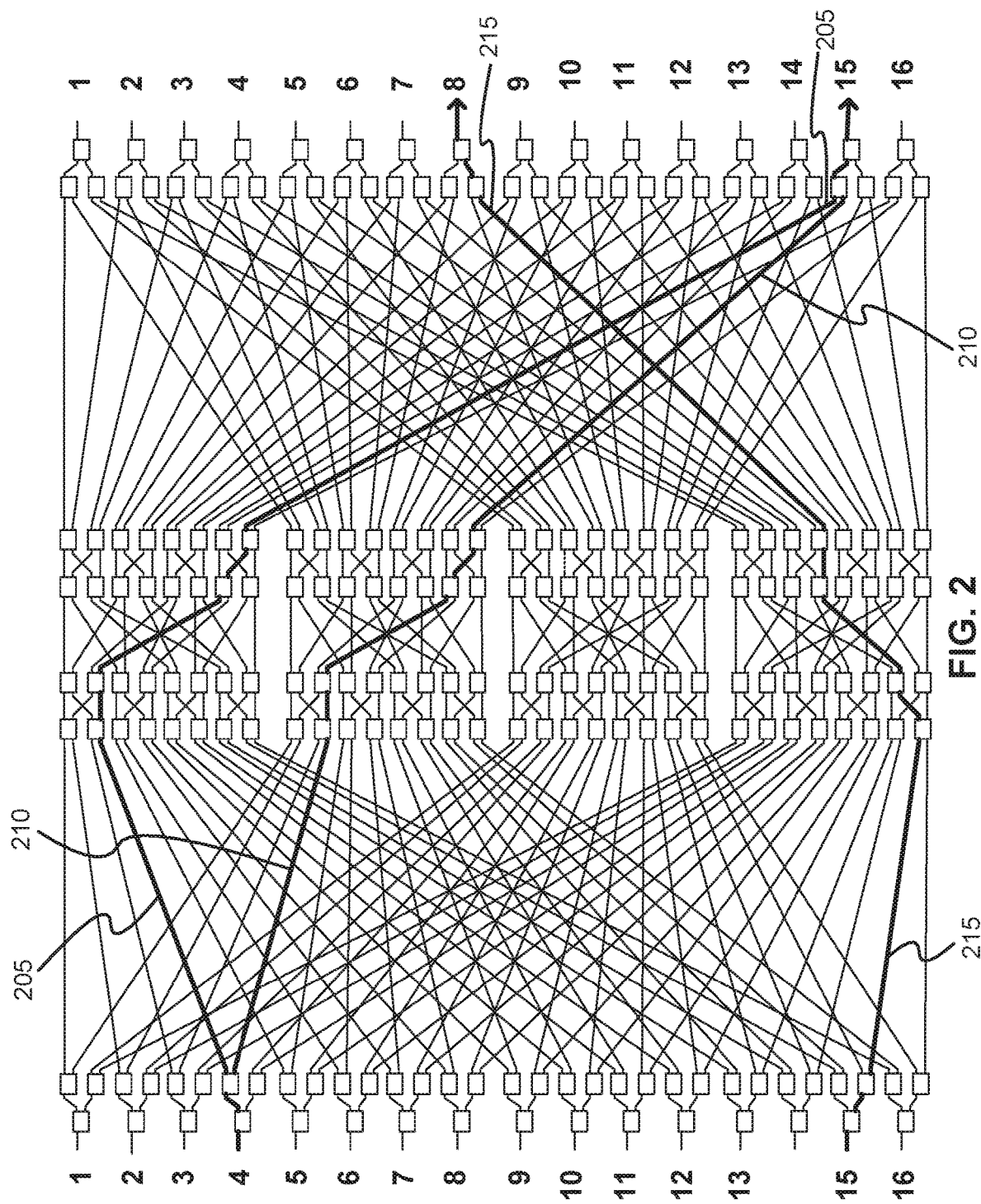
FIG. 2 illustrates example optical paths through the optical switching fabric of FIG. 1A.

FIG. 2 illustrates, by way of further example, the optical switch of FIG. 1A along with several possible optical paths 205, 210, 215. The optical paths 205 and 210 are two alternative paths interconnecting the same input port with the same output port. The optical path 215 interconnects a different input port with a different output port. Each optical path exhibits a different number of waveguide crossings, for example path 205 exhibits about 59 waveguide crossings, path 210 exhibits about 55 waveguide crossings, and path 215 exhibits about 33 waveguide crossings. Each optical path 205, 210, 215 also exhibits a different total length, measured in terms of the length of the interconnecting waveguide sections along the path.

Accordingly, it can be seen that the number of waveguide crossings and total optical path length is significantly variable both for different optical paths between the same two input/output ports, and for different optical paths between different input/output ports. When multiple optical path alternatives are available, embodiments of the present disclosure tend to select paths or sets of paths with fewer waveguide crossings and/or with lower overall path lengths. It is noted that typically multiple optical paths are routed at once, rather than one path being routed at a time.

In view of FIGS. 1A and 2, embodiments of the present disclosure provide a method 300 for operating an optical switching fabric as illustrated in FIG. 3. As discussed above, the optical switching fabric has a plurality of input ports, a plurality of output ports, and a plurality of photonic elements (e.g. Mach-Zehnder type switching cells) operable to selectably optically couple the input ports to the output ports. The method includes receiving 310 an indication to optically couple each designated one of a set of the input ports to a designated one of a set of the output ports. The indication may be provided in the form of a routing instruction or request, indicating port connection requirements at a given time. The method further includes, in response to the indication, implementing 320 an optical switch configuration which establishes a set of optical paths accommodating the indication. The optical switch configuration is determined based at least in part on a loss metric which is based on one or both of: a number of waveguide crossings in each of the optical paths; and a length of each of the optical paths. The method may further comprise determining 315 the optical switch configuration.

Figure 4A:
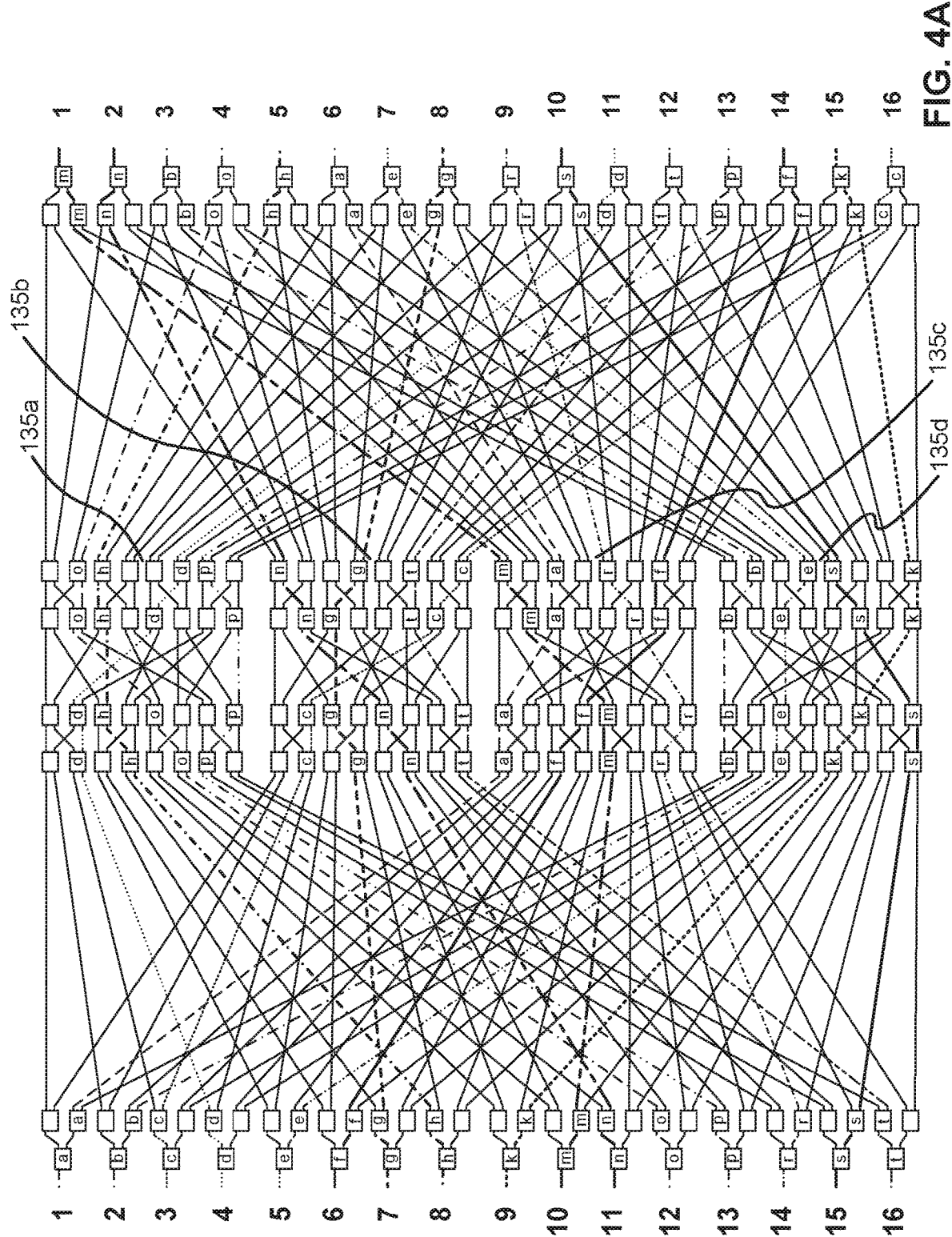
FIG. 4A illustrates a first example configuration for the optical switching fabric of FIG. 1A.

FIG. 4A illustrates a first example configuration (routing map) for the optical switching fabric of FIG. 1A. The configuration illustrates a switch configuration which satisfies a requirement to couple input ports to output ports according to the first two columns of Table 1. Each row of Table 1 gives an input port/output port pair to be coupled together according to the requirement. Different optical paths in FIGS. 4A and 4B connecting pairs of input ports to output ports as in Table 1 are illustrated using differently patterned lines for the waveguides involved. Switching cells along the same optical path are designated with the same reference letters. Table 1 also shows, for the configuration of FIG. 4A, the intermediate stage which the optical path coupling the corresponding input port/output port pair passes through. Table 1 also shows, for the configuration of FIG. 4A, the number of waveguide crossings in the optical path coupling the corresponding input port/output port. The per-path loss metric in this example is the number of waveguide crossings along the path.

TABLE 1

| Input | Output | Intermediate Stage | Waveguide Crossings |
|-------|--------|--------------------|---------------------|
| 1     | 6      | 135c               | 57                  |
| 2     | 3      | 135d               | 81                  |

TABLE 1-continued

| Input | Output | Intermediate Stage | Waveguide Crossings |
|---|---|---|---|
| 3 | 16 | 135b | 47 |
| 4 | 11 | 135a | 39 |
| 5 | 7 | 135d | 60 |
| 6 | 14 | 135c | 44 |
| 7 | 8 | 135b | 43 |
| 8 | 5 | 135a | 33 |
| 9 | 15 | 135d | 24 |
| 10 | 1 | 135c | 53 |
| 11 | 2 | 135b | 41 |
| 12 | 4 | 135a | 42 |
| 13 | 13 | 135a | 72 |
| 14 | 9 | 135c | 41 |
| 15 | 10 | 135d | 21 |
| 16 | 12 | 135b | 56 |

As can be seen from Table 1, the highest number of waveguide crossings is 81, while the lowest number of waveguide crossings is 21. This gives 81−21=60 as the difference between the maximum number of waveguide crossings (among all of the optical paths) and the minimum number of waveguide crossings (among all of the optical paths).

Figure 4B:
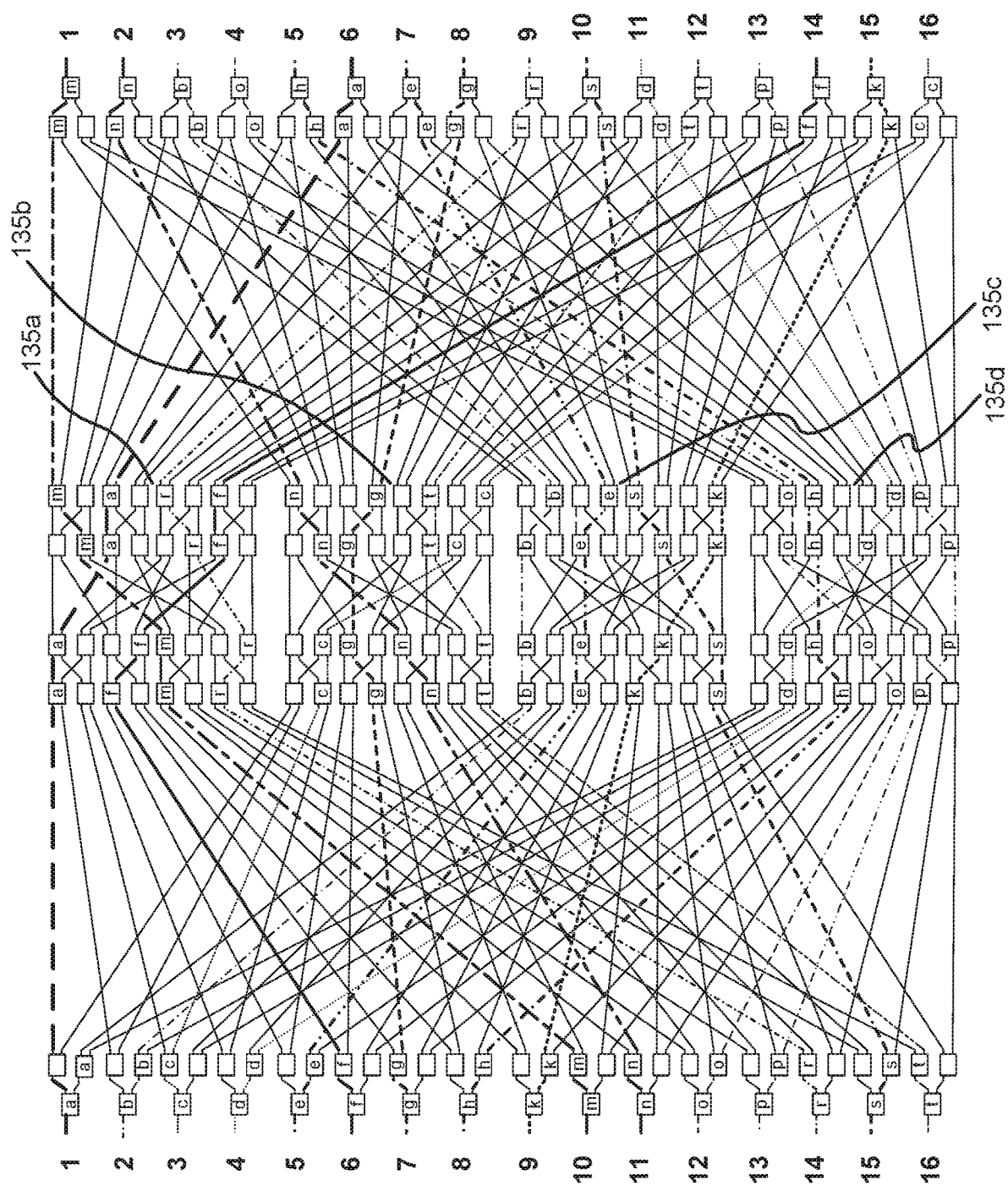
FIG. 4B illustrates a second example configuration for the optical switching fabric of FIG. 1A, satisfying the same configuration requirements as that of FIG. 4A.

FIG. 4B illustrates a different example configuration satisfying the same configuration requirements as that of FIG. 4A. Table 2 shows, for the configuration of FIG. 4B, the intermediate stage which the optical path coupling the corresponding input port/output port pair passes through. Table 2 also shows, for the configuration of FIG. 4B, the number of waveguide crossings in the optical path coupling the corresponding input port/output port.

TABLE 2

| Input | Output | Intermediate Stage | Waveguide Crossings |
|---|---|---|---|
| 1 | 6 | 135a | 15 |
| 2 | 3 | 135c | 59 |
| 3 | 16 | 135b | 47 |
| 4 | 11 | 135d | 51 |
| 5 | 7 | 135c | 52 |
| 6 | 14 | 135a | 54 |
| 7 | 8 | 135b | 43 |
| 8 | 5 | 135d | 57 |
| 9 | 15 | 135c | 40 |
| 10 | 1 | 135a | 27 |
| 11 | 2 | 135b | 41 |
| 12 | 4 | 135d | 48 |
| 13 | 13 | 135d | 18 |
| 14 | 9 | 135a | 63 |
| 15 | 10 | 135c | 39 |
| 16 | 12 | 135b | 56 |

As can be seen from Table 2, the highest number of waveguide crossings is 63, while the lowest number of waveguide crossings is 15. This gives 63−15=48 as the difference between the maximum number of waveguide crossings (among all of the optical paths) and the minimum number of waveguide crossings (among all of the optical paths). Furthermore, the maximum number of waveguide crossings has been reduced by 18 relative to Table 1. Thus, the configuration of FIG. 4B satisfies the same input/output port coupling requirement but with a lower overall loss metric, which is taken in the present example to be the difference between the maximum number of waveguide crossings and the minimum number of waveguide crossings, or which can alternatively be taken to be the maximum number of waveguide crossings among all optical paths. Therefore, according to embodiments of the present disclosure, the configuration of FIG. 4B is preferred over that of FIG. 4A. It is noted that blocking and crosstalk performance are substantially the same for FIGS. 4A and 4B. The configuration of FIG. 4B may also result when the overall loss metric is the maximum number of waveguide crossings taken over all paths in the switching fabric.

In fact, when the per-path loss metric is taken as the number of waveguide crossings along a given optical path, and the overall loss metric is taken as the difference between the maximum value, among all of the optical paths, of the per-path loss metric and the minimum value, among all of the optical paths, of the per-path loss metric, and when the loss is considered as the worst case loss of a connection, it can be shown that FIG. 4B illustrates the optical switch configuration with the smallest overall loss metric that satisfies the given input port/output port coupling requirement. As such, this configuration is the most preferred alternative and can be implemented in response to an indication to optically couple input ports to output ports according to the given input port/output port coupling requirement.

The configuration of FIG. 4B can be obtained from the configuration of FIG. 4A by re-ordering (interchanging) the intermediate stages. In particular, to obtain the FIG. 4B configuration from that of FIG. 4A, stage 135a of FIG. 4B is configured as stage 135c of FIG. 4A, stage 135b of FIG. 4B is configured as stage 135b of FIG. 4A, stage 135c of FIG. 4B is configured as stage 135d of FIG. 4A, and stage 135d of FIG. 4B is configured as stage 135a of FIG. 4A. For clarity, "configuring a first (intermediate) stage as a second (intermediate) stage" comprises internally configuring the switching elements of the first intermediate stage in the same manner as those of the second intermediate stage, in order to create the same set of optical path (internally to the intermediate stage). It additionally comprises configuring the input and output stages so that, whenever an input port and an output port of the switch were routed to a given input and output of the second intermediate stage, those same input and output ports are instead routed to the same corresponding input and output of the first intermediate stage.

Figure 5:
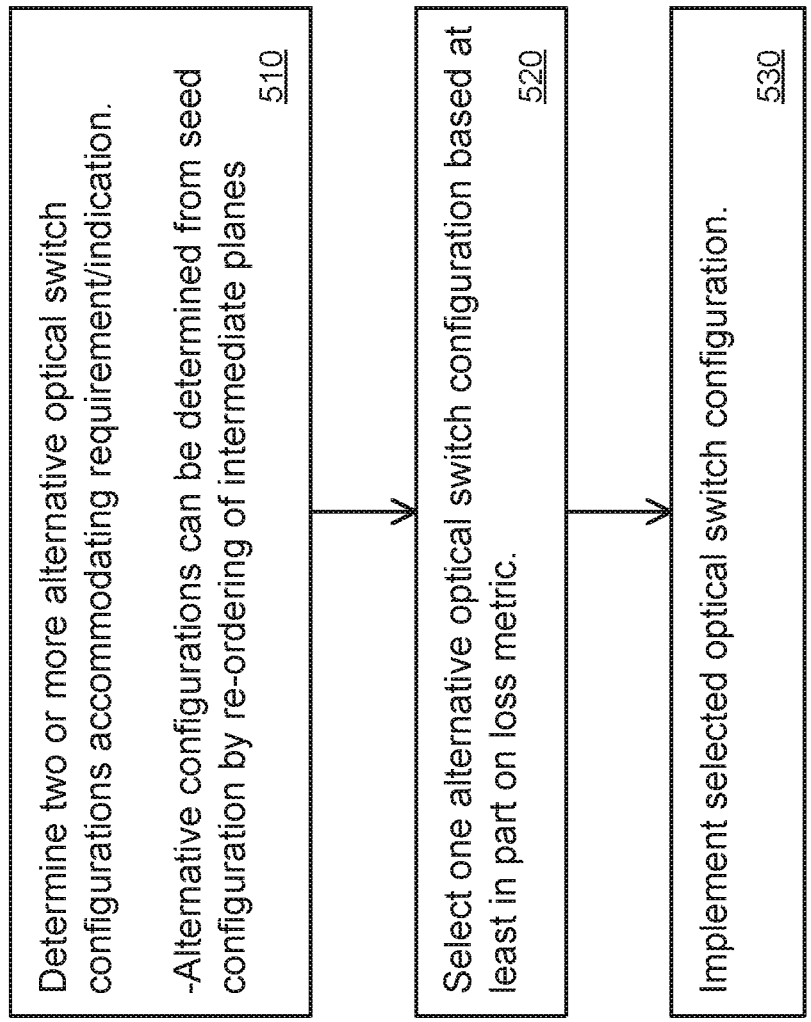
FIG. 5 illustrates a method for determining an optical switch configuration by re-ordering intermediate stages, according to embodiments of the present disclosure.

FIG. 5 generally illustrates a corresponding method 500 for determining an optical switch configuration by re-ordering intermediate stages. The re-ordering can be done in a representation of the optical switching fabric stored in computer memory before implementation, or the re-ordering can be done by actually physically reconfiguring the optical switching fabric, although this second option may result in unnecessary additional switching. The method 500 includes determining 510 two or more alternative optical switch configurations. Each of the alternative optical switch configurations establishes a corresponding set of optical paths accommodating the indication. In various embodiments, the alternative optical switch configurations differ from one another with respect to a re-ordering of the plurality of intermediate stages of the optical switch. This may be the sole difference between alternative configurations. Some or all possible such alternative configurations can be determined, for example by generating an initial seed configuration and obtaining alternative configurations by performing a re-ordering. The method further includes selecting 520 one of the alternative optical switch configurations based at least in part on the loss metric. For example, a comparison of the loss metric applied to each of the alternative optical switch configurations may be made, and the configuration with the most favorable (e.g. lowest-valued) loss metric may be selected. The loss metric may be determined for all alternative configurations or for selected ones of the alternative configurations. Various exhaustive or non-exhaustive computational approaches can be used to select a globally optimal, locally optimal, near-optimal, or adequately optimal switch configuration. The method further includes implementing 530 the selected configuration by driving the optical switch appropriately.

Figure 6:
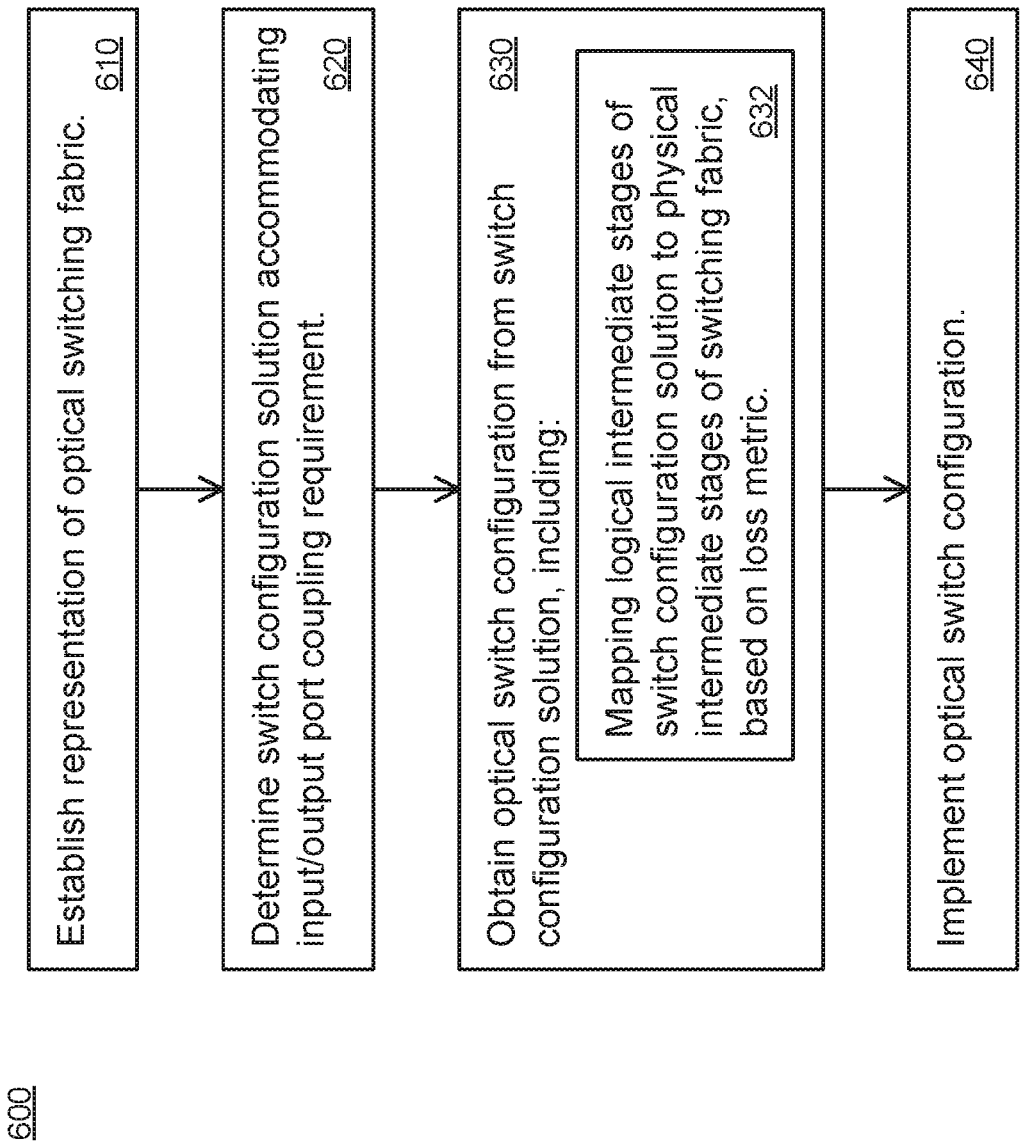
FIG. 6 illustrates a method for determining an optical switch configuration by mapping logical intermediate stages to physical intermediate stages, according to embodiments of the present disclosure.

In some embodiments, the use of logical intermediate stages (also referred to as logical planes) is introduced instead of, or to facilitate, the process of re-ordering intermediate stages. The intermediate stages are presumed for ease of exposition to be substantially interchangeable, for example due to similar or identical structure or function. As shown in a corresponding method 600 illustrated in FIG. 6, a representation of the optical switching fabric is established 610, for example as a model of the switch held by a computer, such as a computer integrated into or otherwise coupled to the switch controller. The representation includes a plurality of logical intermediate stages, representative of, and equal in number to, the intermediate stages of the switching fabric.

The computer then determines 620 a switch configuration solution indicative of a set of paths in the representation of the optical switching fabric. The set of paths accommodates a given input port/output port coupling requirement. The coupling requirement is also referred to as an indication to optically couple each designated one of a set of the input ports to a designated one of a set of the output ports. The switch configuration solution can be indicative of the set of paths, a configuration of switching cells resulting in the set of paths, or both. The switch configuration solution can represent a set of paths that satisfies other criteria. For example, the switch configuration solution can represent a set of non-blocking paths through the switching fabric, which exhibit limited or minimal crosstalk.

Next, the optical switch configuration is obtained 630 from the switch configuration solution. This includes mapping 632 the logical intermediate stages to the actual intermediate stages of the switch. The mapping is based at least in part on the loss metric, for example by performing the mapping in a manner which substantially minimizes or limits the loss metric. The method further includes implementing 640 the optical switch configuration by driving the optical switch appropriately. This may include controlling the switching cells of the switching fabric to implement desired optical paths.

The mapping process is described in more detail as follows. P logical intermediate stages can be associated with P physical intermediate stages in P factorial different ways. In any given one of these associations, also referred to as a mapping, the $n^{th}$ logical stage (for n ranging from 1 to P) is associated with a $k^{th}$ physical stage (for k also ranging from 1 to P), and all logical and physical stages are so mapped in a one-to-one manner. According to the mapping, each $k^{th}$ physical stages is internally configured in the same manner as its associated $n^{th}$ logical stage. The internal configuration refers to the configuration of switching cells of the physical/logical stage. Also according to the mapping, whenever a given input port in the (logical) switch configuration solution is coupled to a given input of a logical stage, the corresponding input port in the physical switching fabric is coupled to the same input of the associated physical stage. Similarly, whenever a given output port in the (logical) switch configuration solution is coupled to a given output of a logical stage, the corresponding output port in the physical switching fabric is coupled to the same output of the associated physical stage.

The above can be more clearly understood, by way of example, by viewing the configuration of FIG. 4A as a (logical) switch configuration solution and viewing the configuration of FIG. 4B as an associated physical switch configuration. In FIG. 4A, intermediate stages 135a, 135b, 135c, 135d are thus viewed as logical stages, while in FIG. 4A, they are viewed as physical stages. For purposes of discussion, the intermediate stages in FIG. 4A are labeled as followed: 135a is L1, 135b is L2, 135c is L3, and 135d is L4. The intermediate stages in FIG. 4B are labeled as followed: 135a is P1, 135b is P2, 135c is P3, and 135d is P4. Now, according to the mapping of the switch configuration solution of FIG. 4A to the physical switch configuration of FIG. 4B, L1 is associated with P4, L2 is associated with P2, L3 is associated with P1, and L4 is associated with P3. Accordingly, L1 and P4 have the same internal configuration and have the same inputs and outputs coupled to the same input ports and output ports, respectively. Similarly, L2 and P2 have the same internal configuration and input/output couplings, as do L3 and P1, and L4 and P3.

As such, a given switch configuration solution can be physically implemented in N factorial different ways. According to the present disclosure, one of these different ways is selected according to a loss metric. In particular, an implementation which substantially minimizes or otherwise limits the loss metric is selected. Embodiments of the disclosure may therefore implement a pathfinding procedure including three phases. First, a set of logical intermediate stages (planes) representing physical intermediate stages of the optical switch are defined. Then, non-blocking routes with least (or limited) crosstalk through the logical planes are then determined. Then, the logical intermediate stages are mapped to the physical intermediate stages in a manner that minimizes or limits the loss metric (e.g. number of waveguide crossings and/or variations therein). Determining the switch configuration solution may comprise finding a solution comprising non-blocking paths with minimum crosstalk, for example. Because the pathfinding method stays substantially the same (except for a re-ordering of intermediate planes), there is no impact on blocking performance of the pathfinding procedure. The main difference in the present disclosure is that, after routes are allocated (e.g. to logical planes), an additional step maps the routes (or logical planes) to physical planes in a manner that limits the loss metric.

In some embodiments, for a multiplane switching fabric having P>2 intermediate stages (P=4 in FIG. 1A) and N connections to be routed, determining a (logical) switch configuration solution, or indeed determining a (physical) optical switch configuration, proceeds as follows. The value N can be equal to the number of input ports or output ports of a switch (N=16 in FIG. 1A), and represents the requested number of connections to be made between input ports and output ports via routed optical paths. First, a first set of N/P connections that can be routed through a first (logical or physical) intermediate stage are determined. Next, for the remaining unrouted connections, another set of N/P connections that can be routed through a second (logical or physical) intermediate stage are determined. This process continues P times until all N connections are routed through all P planes. Once this is done, further optimization of the obtained routing solution in view of the loss metric can be performed as already described above.

Figure 7A:
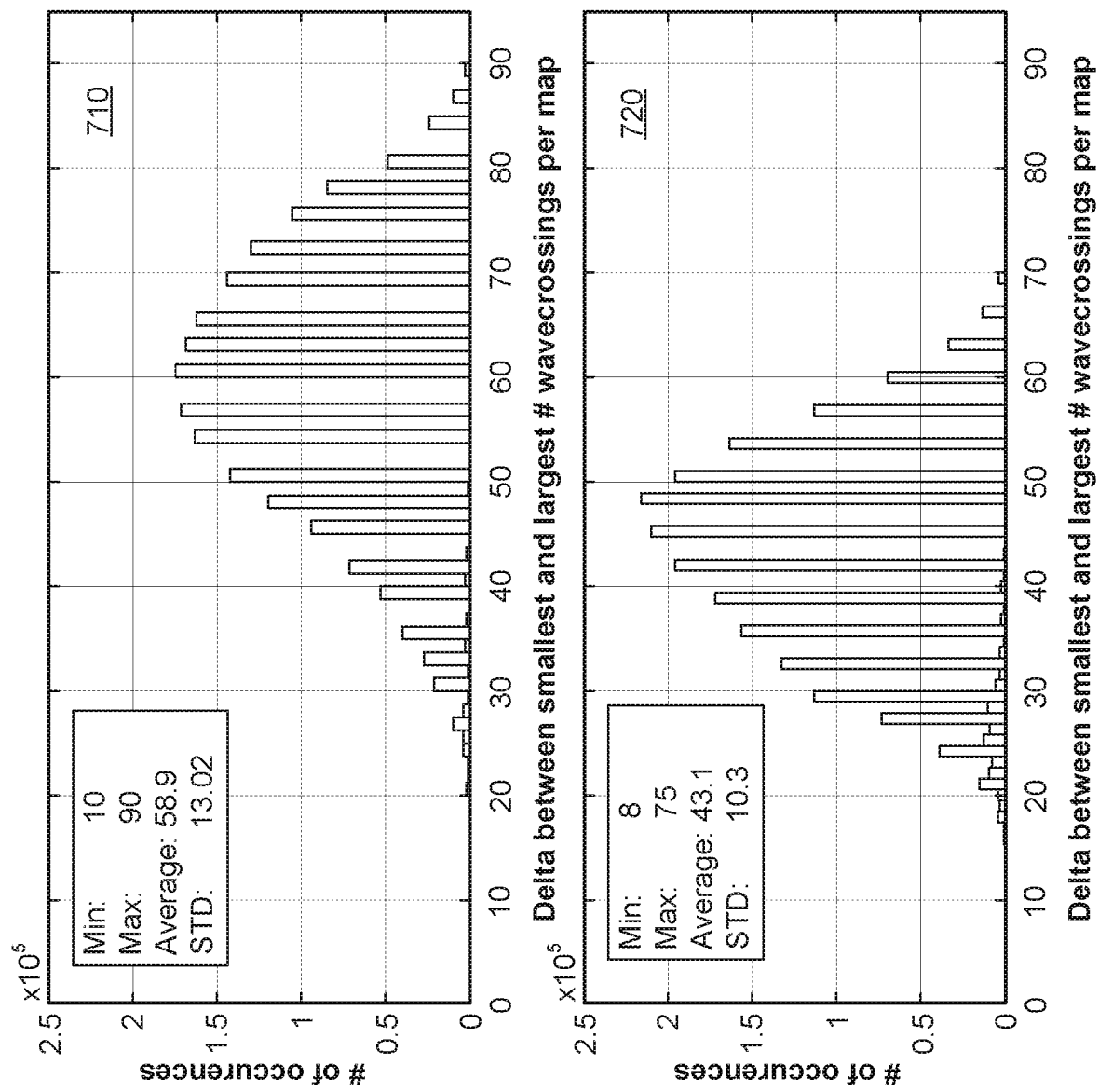
FIG. 7A illustrates performance improvement for the switching fabric of FIG. 1A, obtained for embodiments of the present disclosure via simulation.

The above description of FIGS. 4A and 4B shows a performance improvement for a single connection map. FIG. 7A illustrates comparable performance improvement for the same switch for two million connection maps, obtained through simulation. The top graph 710 is a histogram illustrating the differences (delta) between the maximum and minimum number of waveguide crossings for all of the two million connection maps, without the step of minimizing the number of waveguide crossings. The bottom graph 720 is a histogram illustrating the differences (delta) between the maximum and minimum number of waveguide crossings for all of the two million connection maps, when the step of minimizing the number of waveguide crossings is included. As illustrated, the delta is significantly reduced in the bottom graph, thus illustrating a performance improvement.

FIG. 7B illustrates performance improvement for the same switch, over one million simulated connection maps, when the loss metric is taken as the maximum number of waveguide crossings. The top graph 730 is a histogram illustrating the number of waveguide crossings for all one million connection maps, without the step of minimizing the number of waveguide crossings. The bottom graph 740 is a histogram illustrating the number of waveguide crossings for all one million connection maps, when the step of minimizing the number of waveguide crossings is included. As illustrated, the maximum number of waveguide crossings in the bottom graph 740 is limited to a maximum of about 75, versus about 90 in the top graph 730.

Although the above description refers primarily to the switching fabric of FIG. 1A by way of example, it should be readily understood that the present disclosure is not limited to any particular switching fabric architecture. In particular, switches with more than 16 input an output ports, and more than 4 intermediate planes can be accommodated. One approach to creating larger-scale switching fabrics is to build them by combining multiple copies of smaller-scale switching fabrics. In this and other cases, embodiments of the disclosure can include recursively applying the above-described pathfinding routine for example in a nested optimization approach.

Figure 8:
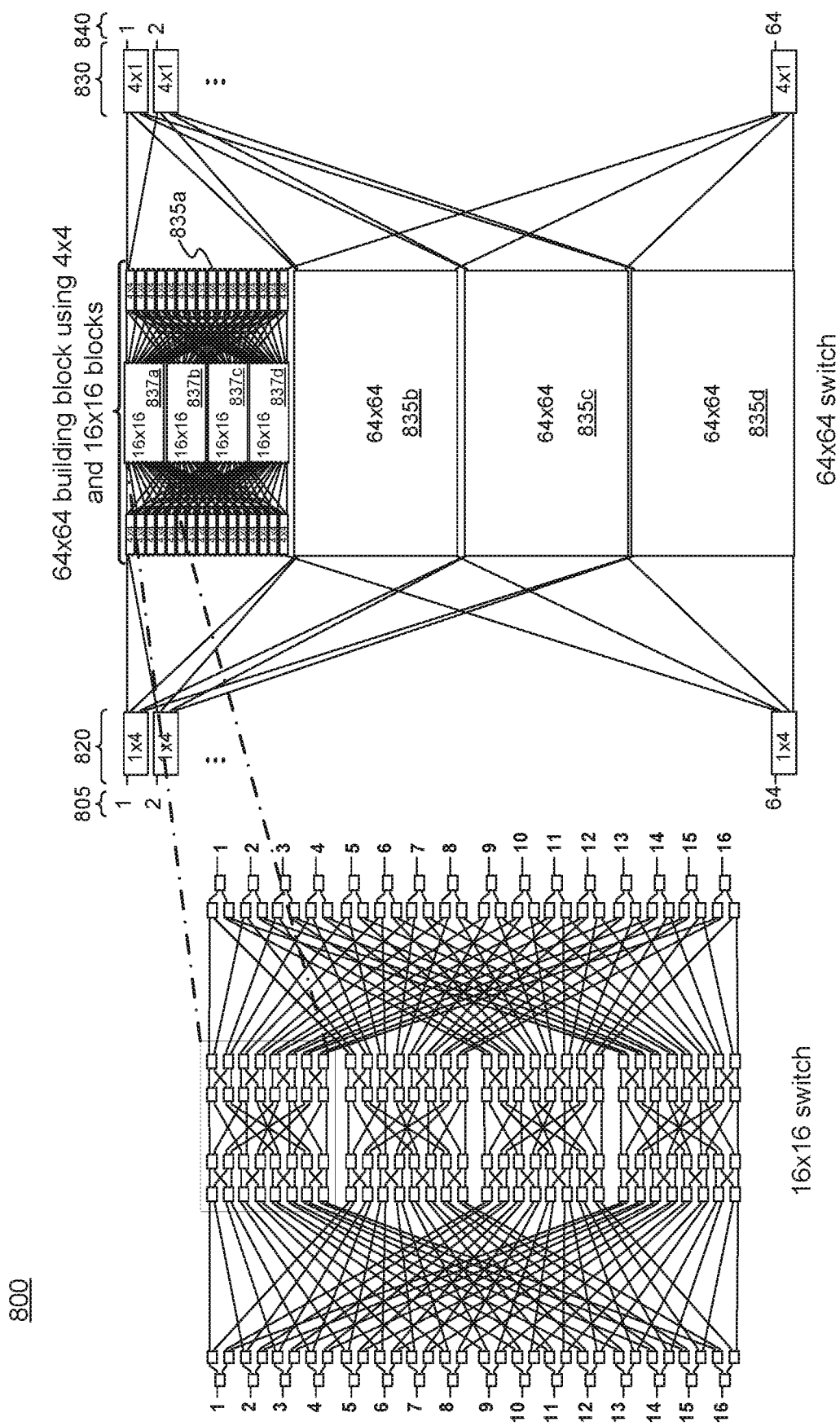
FIG. 8 illustrates an optical switching fabric incorporating 4 intermediate stages each comprising a copy of the switching fabric of FIG. 1A.

FIG. 8 illustrates an optical switching fabric 800 having 64 input ports, 64 output ports, and incorporating 4 intermediate stages 835a, 835b, 835c, 835d each comprising a copy of the switching fabric of FIG. 1A. Each intermediate stage includes its own input stage, output stage, and multiple intermediate stages, in a nested or recursive architecture. This switching fabric, and a 32×32 alternative version, are also described in H. Mehrvar and E. Bernier, "Fast Photonic Switch Architecture for Interconnect Applications," European Conference on Optical Communication, September 2018. The switching fabric 800 is again formed using a plurality of switching cells coupled together using waveguides. The switching fabric 800 includes an input stage 820 having 64 input ports 805 and an output stage 830 having 64 output ports 840. The input stage is operative to couple each input port to any selected one of the intermediate stages. The output stage is operative to couple each output port selected one of the intermediate stages.

For the switching fabric 800, or for other switching fabrics employing a recursive architecture, embodiments of the present disclosure can employ optical pathfinding and optimization in a correspondingly recursive manner.

For example, a representation of the optical switching fabric 800 can be defined, including outer logical intermediate stages representative of the intermediate stages 835a, 835b, 835c, 835d. The representation of the optical switching fabric further includes inner logical intermediate stages. Each inner logical intermediate stage is located within an outer logical intermediate stage. That is, each of the outer logical intermediate stages includes four inner logical intermediate stages, each having 16 inputs and 16 outputs. The inner logical intermediate stages may reflect the same structure as the intermediate stages of FIG. 1A. Inner logical intermediate stages 837a, 837b, 837c, 837d are labelled, by way of example, as four of 16 such stages all belonging to the same outer intermediate stage 835a.

Given this logical representation, which may be generated a priori, pathfinding can proceed as follows. For each outer logical intermediate stage, an outer-level switch configuration solution is determined which indicates a set of paths for some (e.g. 16) of the requested connections. The outer-level switch configuration solution comprises four inner-level switch configuration solutions, one for each inner logical intermediate stage, which are also determined at this point. The inner-level switch configuration solutions each indicate a set of paths for some (e.g. 4) accommodating the connections required through corresponding the outer logical intermediate stage. Furthermore, the inner logical intermediate stages of a given outer logical intermediate stage are re-arranged (within that outer logical intermediate stage) based at least in part on the loss metric. After pathfinding (i.e. determining the inner-level switch configuration solutions and their order/arrangement) has been performed for all outer logical intermediate stages these outer logical intermediate stages can be mapped to the physical intermediate stages 835a, 835b, 835c, 835d based at least in part on the loss metric. Thus, for a two-stage recursive switch architecture such as that of switching fabric 800, intermediate stage mapping or re-ordering based on the loss metric may be performed twice.

In cases, such as above, where all intermediate stages (at multiple levels) are substantially identical (and potentially also in other cases), recursive pathfinding can proceed as follows. It is assumed that there are multiple outermost intermediate stages, and that each intermediate stage contains multiple further intermediate stages, to a depth of L>1 levels. Proceeding inward from the outermost level, switch configuration solutions can be determined indicating sets of optical paths through a corresponding set of intermediate stages. Furthermore, an ordering of the intermediate stages, at one, some or all levels, can be determined based on the loss metric. The ordering gives the mapping of logical to physical intermediate stages. In some embodiments, for each applicable level, the determination of ordering (based on the loss metric) can be performed upon determining the switch configuration solution for that level. In other embodiments, the determination of ordering for each applicable level can be performed at a later time, for example after switch configuration solutions for all levels have been determined.

The pathfinding procedure can be repeated at each nested level stage until the optical paths are fully mapped. At each recursive level, the ordering of the intermediate stages can be determined using a re-ordering technique, or a logical intermediate plane technique, in which the paths are determined in view of the predetermined loss metric.

Figure 9:
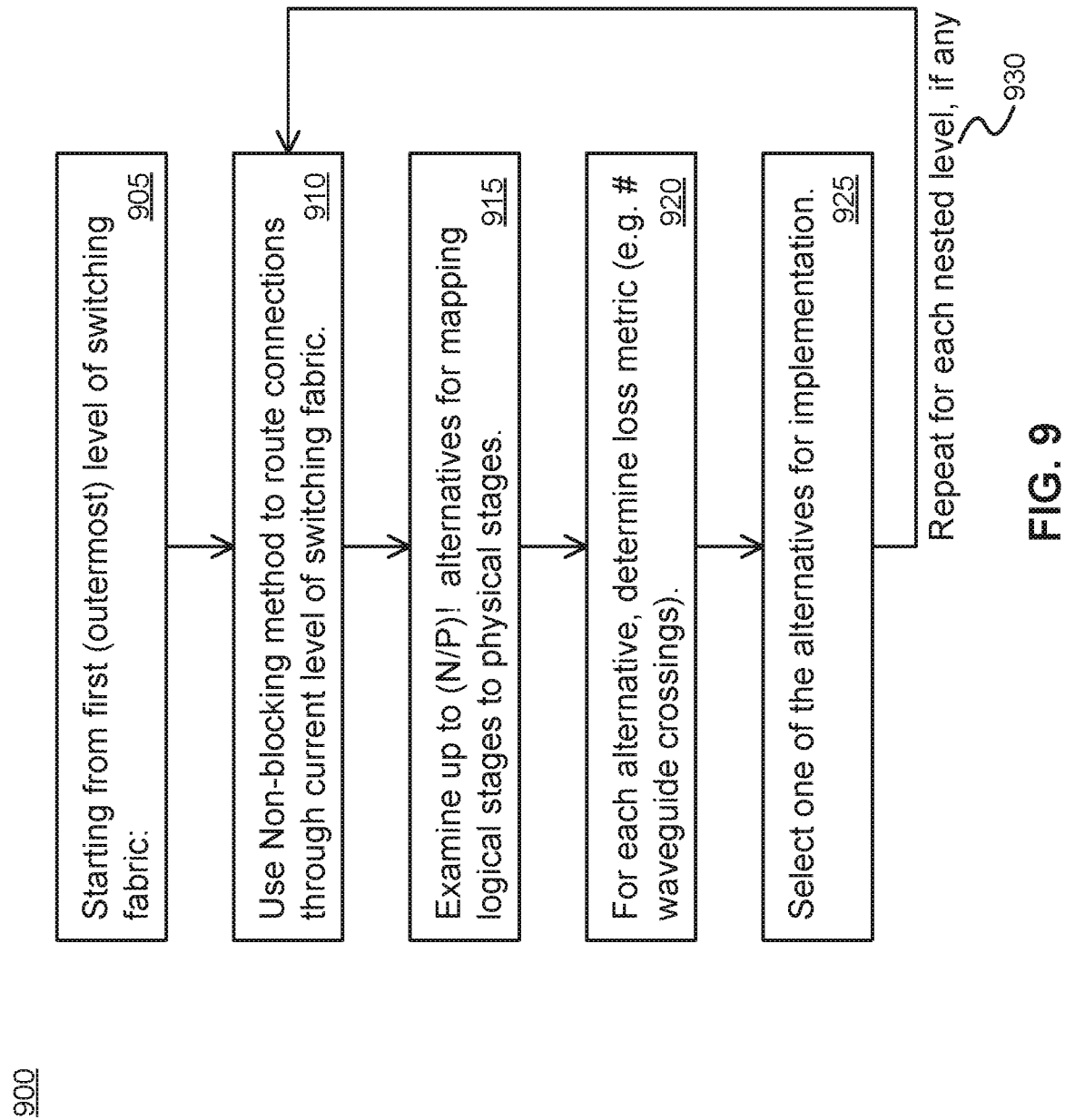
FIG. 9 illustrates a method for determining optical paths in a nested or non-nested optical switching fabric, according to an embodiment of the present disclosure.

FIG. 9 illustrates a method 900 for determining optical paths in a nested or non-nested optical switching fabric, according to an embodiment of the present disclosure. The method includes starting 905 at a first (e.g. outermost) level of the switching fabric. The method further includes routing 910 connections through the current level of switching fabric using a non-blocking method. For N inputs and outputs, and P intermediate stages, the connections can be routed through N/P logical intermediate stages. The method further includes examining 915 up to (N/P) factorial alternative cases for mapping logical intermediate stages to physical stages. For each alternative case, a loss metric (e.g. waveguide crossing loss) can be determined 920. The method further includes selecting 925 one of the alternative cases for implementation. The above process, including steps 910, 915, 920, 925 can be repeated 930 progressively for all or selected ones of the further nested levels of the switching fabric.

Figure 10:
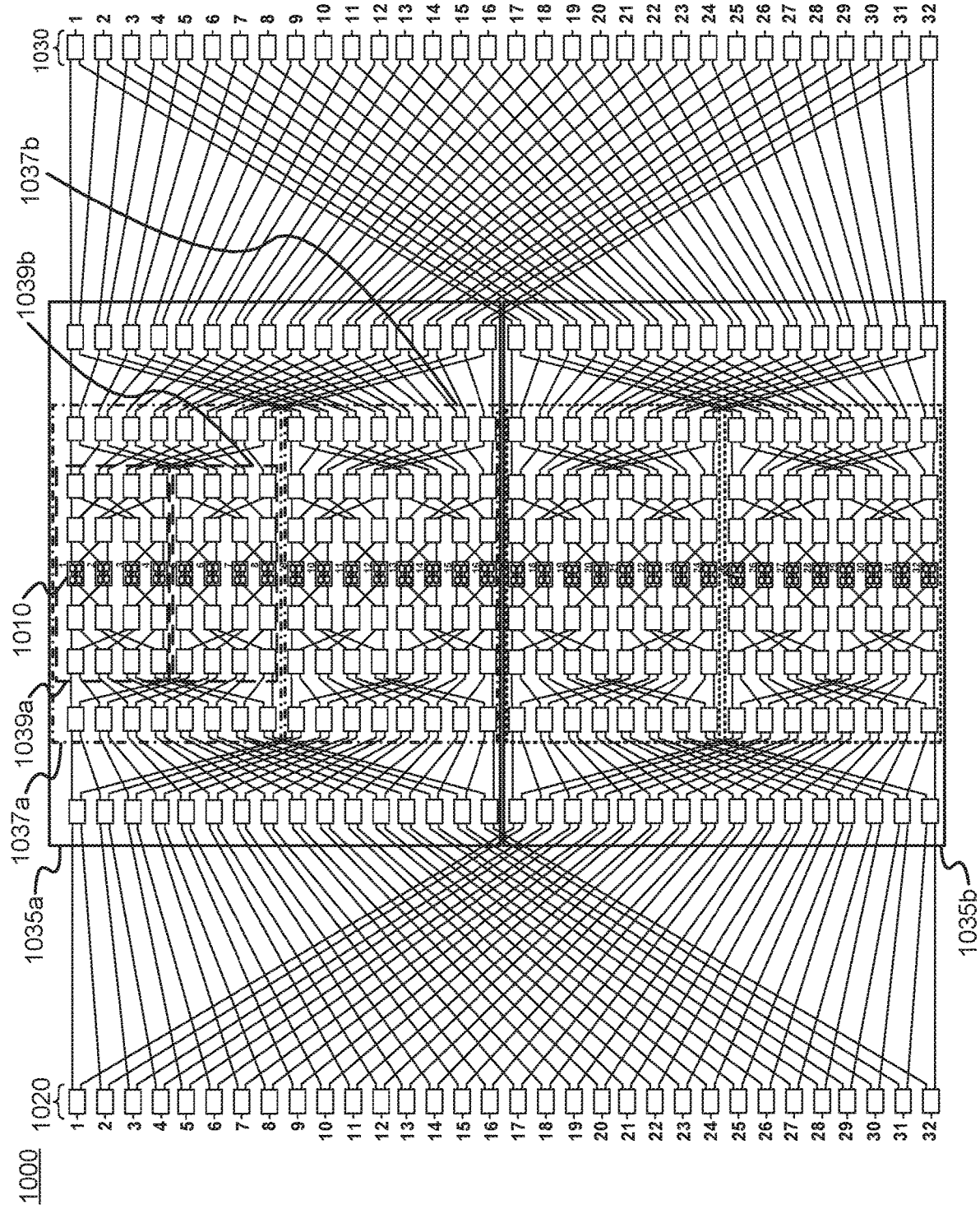
FIG. 10 illustrates another switching fabric provided according to or operable with embodiments of the present disclosure.

FIG. 10 illustrates another switching fabric 1000 which can be involved in embodiments of the present disclosure. The architecture of the switching fabric 1000 is a Benes, Dilated Benes or Hybrid Dilated Benes Enhanced (HDBE) architecture, depending on the configuration of the centermost 2×2 switching cells 1010. In particular, when the switching cells 1010 are simple 2×2 (e.g. interferometric) switching cells constructed similarly to the other 2×2 switching cells of the fabric, the architecture is referred to as Dilated Benes. When the switching cells 1010 are themselves formed from four cross-connected simple 2×2 switching cells, the architecture is referred to as HDBE. The architecture is an example of a recursive dual-plane architecture. The switching fabric 1000 exhibits at least three levels (layers) of recursion. Three, four, or more layers of recursion may be present. There are two outermost intermediate stages (or sub-planes) 1035a, 1035b, each of which has two further intermediate stages (e.g. 1037a, 1037b), each of which has two even further intermediate stages (e.g. 1039a, 1039b), and so on. The switching fabric 1000 has an input stage 1020 having N=32 input ports and an output stage 1030 having N=32 output ports. More or fewer input ports and output ports can be accommodated, for example in a comparable architecture having more or fewer levels of recursion, respectively.

Pathfinding in the switching fabric 1000, and in similar architectures, can proceed generally as already described above, or as follows. First, assuming all N input ports are to be routed to all N output ports in a given correspondence, two sets of N/2 connections that result in a minimum for the loss metric are determined. This may be done for example by minimizing total optical path distance or waveguide crossing distance between pairs of input and output ports.

For example, number the input ports and output ports from 1 to N, with each input port having the same number as its diametrically opposite output port. If, in a given requirement to couple a particular input port to a particular output port, the number value for an input port plus the number value for an output port is less than 2N, then the coupling is routed through the upper plane, otherwise it is routed through the lower plane. In this context, "upper plane" refers to the intermediate stage that is physically closer to the output and output ports having the lowest number value, and "lower plane" refers to the other of the two intermediate stages.

Next, for each set of N/2 connections, two sets of N/4 connections that result in a minimum for the loss metric are determined in a similar manner. This process is repeated recursively until a full set of optical paths satisfying the given mapping between input ports and output ports is determined.

Pathfinding for the dual-plane recursive architectures is performed on two planes (at the same level) at a time, with pathfinding applied to the outermost two planes first, followed by pathfinding applied to the two planes nested within each of the outermost planes, and so on.

In some embodiments and similarly to the above, pathfinding may involve the following. For the N input ports and N output ports, two sets of N/2 input ports and N/2 output ports are determined such that the routing method can route each of the two sets using one of the upper plane and the lower plane. Next, each of the two sets are evaluated with respect to both to the upper layer and the lower layer to determine the number of waveguide crossings that would be required to route a particular set using a particular layer. (In some embodiments this may refer only to waveguide crossings from the ports to the layers, rather than waveguide crossings within the layers.) This yields two alternative values: a first value representing the total number of waveguide crossings when the upper layer is used to route the first set and the lower layer is used to route the second set; and a second value representing the total number of waveguide crossings when the lower layer is used to route the first set and the lower upper is used to route the second set. The set-to-layer assignment yielding the lower of the first and second values is selected. This process is then repeated recursively for each of the upper plane and the lower plane, viewed as its own separate switching fabric. Other routing metrics can be substituted in the above.

The example embodiments presented above consider the number of waveguide crossings as the per-path loss metric. However, it is considered that the per-path loss metric can additionally or alternatively reflect other factors. For example, the per-path loss metric can be based at least in part on the total length of waveguide sections (optical path length) used to couple the switching fabric's input port and the output port for an optical path. Crosstalk, number of switching cells, and similar considerations can also be factored into the per-path loss metric. In some embodiments, the per-path loss metric can be based on a combination of factors. For example, the per-path loss metric can be a weighted combination of the number of waveguide crossings and the optical path length, or another increasing function of one or both of these variables.

It is also considered that the per-path loss metric can be different for embodiments which are applied to optical devices other than an optical switching fabric. For example, the total optical path length can be considered as part of the per-path loss metric even when the optical signals are not confined within a particular waveguide, for example in the case of certain wavelength selective switches (WSS) or other devices in which optical signals propagate in an unconfined medium. In such cases, the per-path loss metric can additionally or alternatively account for the number of crossings or near-crossings of (potentially unconfined) optical paths, when such crossings or near-crossings result in signal degradation.

The example embodiments presented above consider the overall loss metric, to be minimized, as the difference between the maximum number of waveguide crossings among all paths through the switch and the minimum number of waveguide crossings among all paths through the switch. However, it is considered that other overall loss metrics may also be employed. For example, the overall loss metric may be a difference between a maximum value, among all of the optical paths, of a particular per-path loss metric and a minimum value, among all of the optical paths, of the per-path loss metric. As another example, the overall loss metric may be another measure of variation, among all of the optical paths, of the per-path loss metric. The measure of variation may be based for example on a statistical characteristic such as variance or standard deviation, or a sum of differences of per-path loss metrics from an average value. As another example, the overall loss metric may be a maximum value, among all of the optical paths, of the per-path loss metric. As another example, the overall loss metric may be an average value, among all of the optical paths, of the per-path loss metric. Other overall loss metrics, determined based on a combination of per-path loss metrics, can also be employed.

The optical switch configuration is determined based on substantially minimizing the overall loss metric. This can include computing a global minimum for the overall loss metric, or computing a local minimum. This can also include computing a configuration which has a loss metric that falls below a predetermined threshold, or a best of M candidate configurations. The computation can be exhaustive by considering all alternative configurations. Alternatively the computation can consider a subset of all alternative configurations, selected randomly or according to a given routine or heuristic. Various statistical or exhaustive minimization routines can be employed as would be readily understood by a worker skilled in the art. Non-exhaustive methods may be particularly useful when the switching fabric is large.

Embodiments of the present disclosure can be used to reduce insertion loss, variation in insertion loss, or both, for a given optical switch or other optical device. Insertion loss can be reduced by reducing optical path or waveguide crossings. For a 16×16 switching fabric, insertion loss improvement may be 0.5 dB to 1 dB in some embodiments. This can depend on the amount of waveguide crossing loss (e.g. 0.03 dB to 0.06 dB per crossing). Total optical path length may also be reduced. For the illustrated 64×64 switching fabric, insertion loss improvement may be 2 dB to 3 dB in some embodiments. This may be due to about 55 fewer waveguide crossings (40 at a first level and 15 at a second level), with an estimated maximum number of waveguide crossings being 210 in some embodiments.

Embodiments of the present disclosure particularly provide for loss uniformity i.e. limiting of insertion loss variations, in an optical device. This can improve signal uniformity and reduce error rates in operations, particularly as traffic switches from one port to another.

Figure 11:
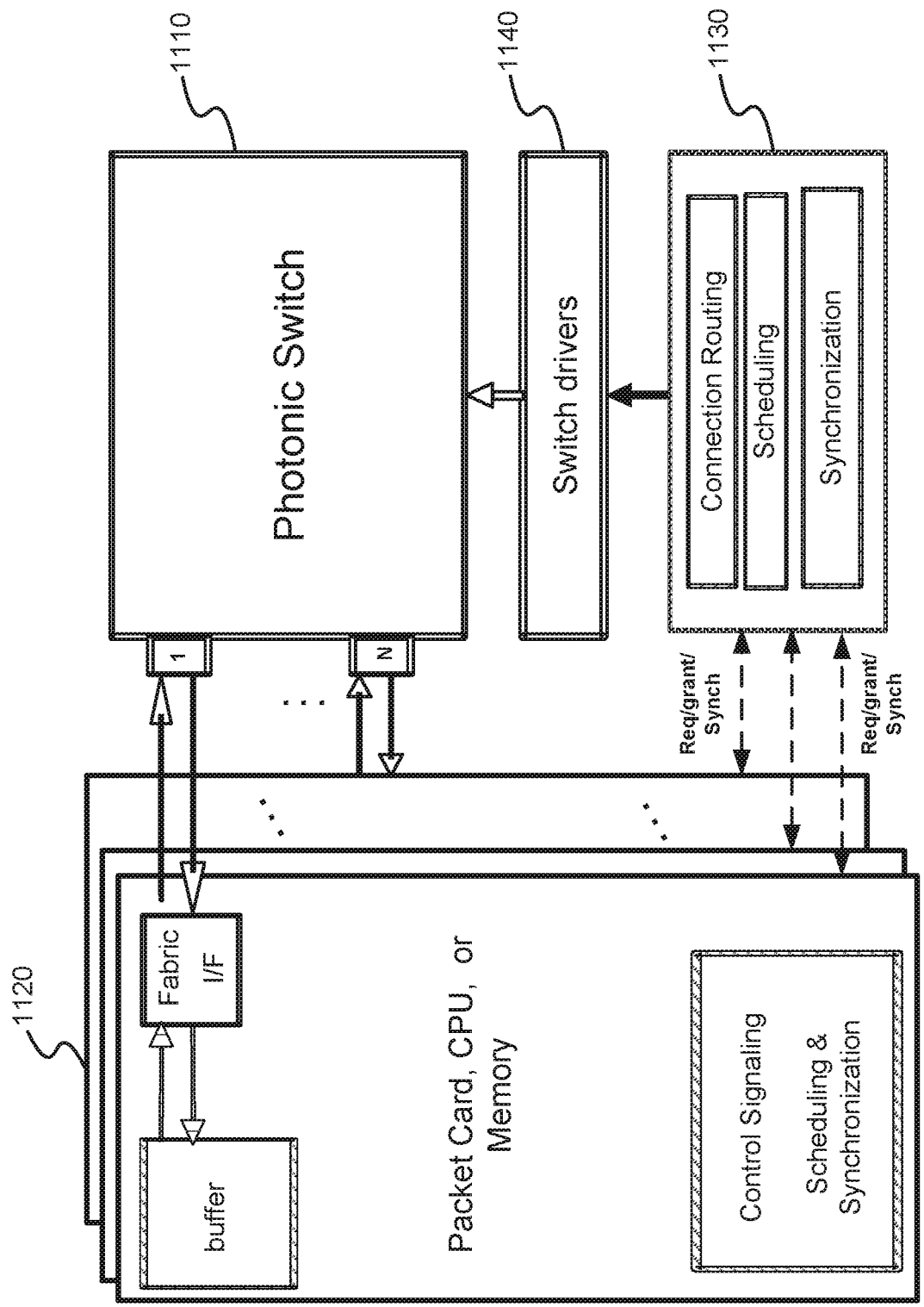
FIG. 11 illustrates a photonic system for computing and datacenter usage, in which an optical switch may be operated according to embodiments of the present disclosure.

FIG. 11 illustrates a photonic system for computing and datacenter usage. The photonic switch 1110 is used to route optical paths between devices 1120, such as packet cards, CPU devices, and memory devices. In particular, connection routing can proceed as described herein. The connection routing is determined by a controller 1130 and implemented using switch drivers 1140.

Figure 12:
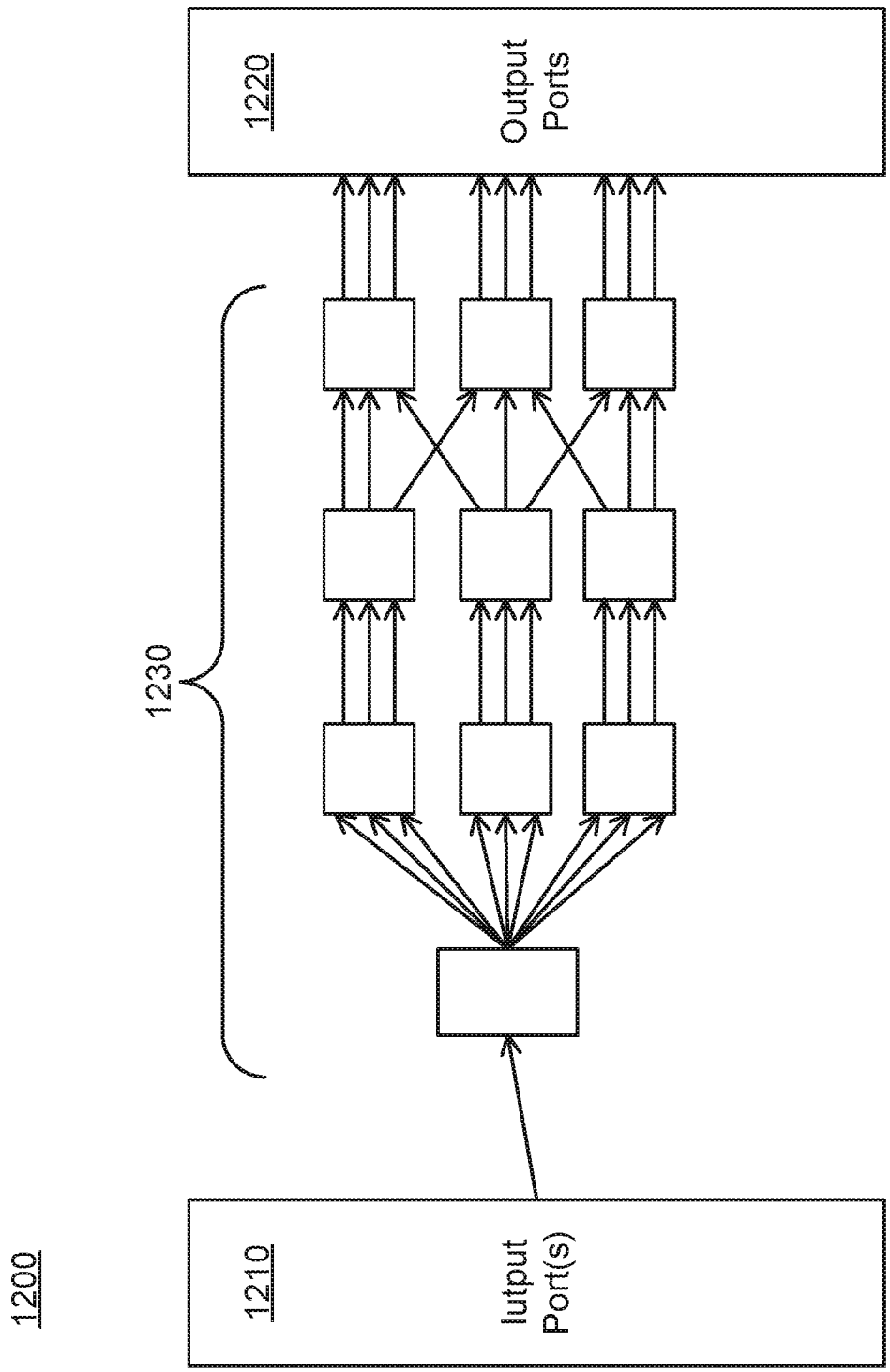
FIG. 12 illustrates an optical device such as a wavelength selective switch, which can be provided and operated according to embodiments of the present disclosure.

FIG. 12 illustrates an optical device 1200 such as a wavelength selective switch, which can be provided and operated according to embodiments of the present disclosure. The optical device has one or multiple input ports 1210 and multiple output ports 1220, and elements 1230 operable to selectably optically couple the input ports to the output ports. The elements can include wavelength selective switches, optical devices such as lenses, reflectors, filters, and splitters, or other optical components. Interferometric devices such as 2×2 switching elements can additionally or alternatively be used. Optical paths may be confined to media such as waveguides or optical fibers, or they may be substantially unconfined.

In the illustrated optical device 1200, by way of example, there are one or a plurality of input ports 1205 and a plurality of output ports 1240, for receiving and providing optical signals, respectively. The optical device 1200 further includes elements 1230 such as diffraction gratings, lenses, beam steering arrays, polarizers, collimators, and controllable reflective devices such as MEMS devices. Optical signals of the same or different wavelengths can be transmitted via physically proximate paths which potentially interfere with each other. The optical signals can be propagated at least partially in free space within the optical device. Two different signals can be routed via paths which partially overlap, for example before reaching an optical splitter.

The optical device 1200 (or an optical switching fabric) may be operated, by a suitable method or controller, as follows. An indication is received to optically couple one, some or all of the designated input ports to corresponding output ports, for example but not necessarily in a one-to-one manner. In response to the indication, an optical device configuration is implemented which establishes a set of optical paths accommodating the indication. The optical device configuration is determined based at least in part on a loss metric which is based on one or both of: a number of crossings or near crossings in each of the optical paths; and a length of each of the optical paths. The configuration can be determined as described herein, by selecting one configuration out of a plurality of alternatives, based on a loss metric. In some embodiments, this includes determining an initial seed configuration, and then using symmetries and similarities in the optical device internal structure (e.g. a plurality of intermediate stages) to generate one or more alternative configurations. The seed and alternative configurations are then evaluated and one with a more (or most) favourable loss metric is selected and implemented.

Figure 13:
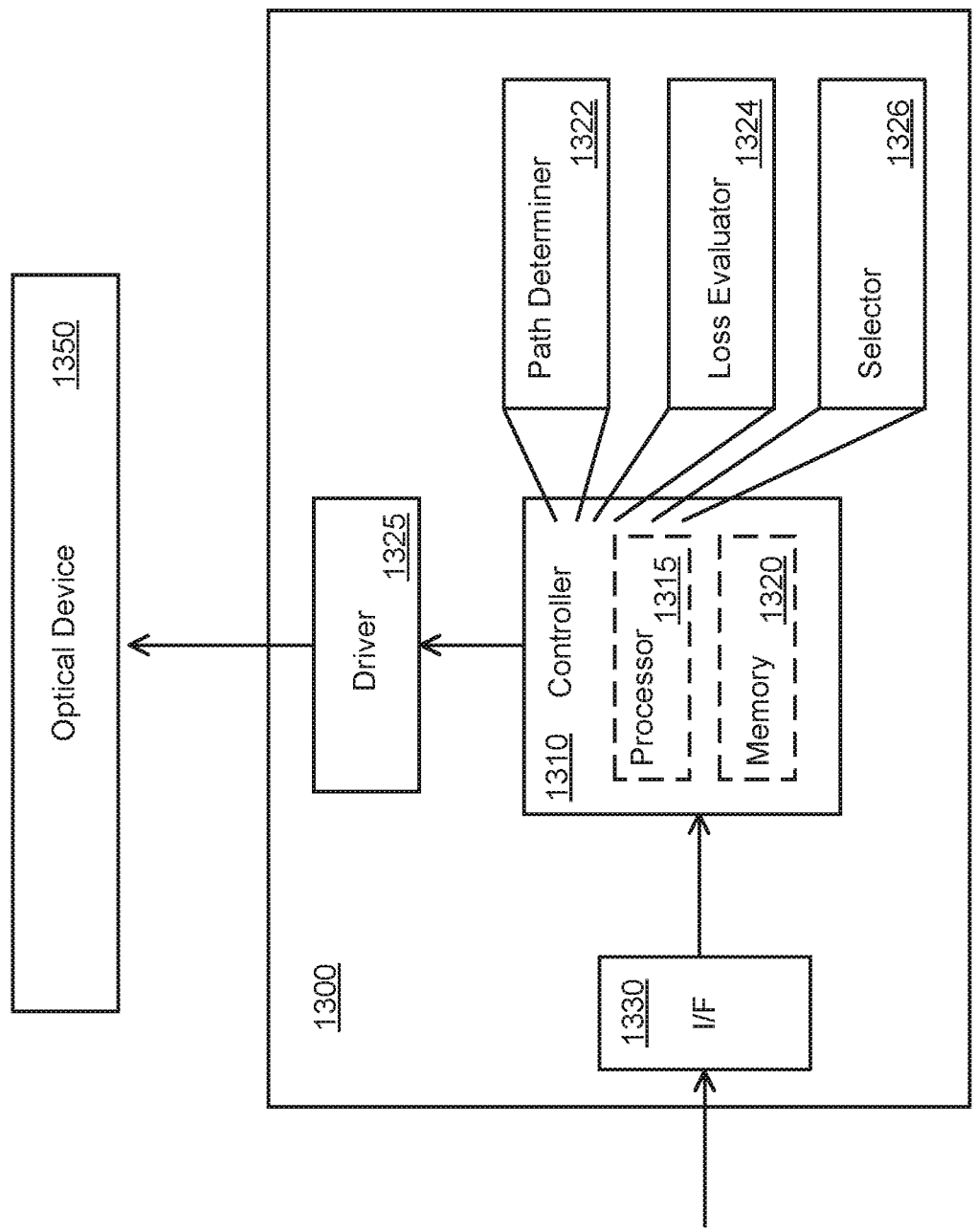
FIG. 13 illustrates an apparatus for controlling an optical device such as an optical switching fabric, provided in accordance with embodiments of the present disclosure.

FIG. 13 illustrates an apparatus 1300 provided in accordance with embodiments of the present disclosure. The apparatus includes or is operatively coupled to an optical device 1350 such as an optical switching fabric. The apparatus is configured to control the optical device, for example so as to cause optical paths between input ports and output ports to traverse a selected route. The apparatus includes a controller 1310, such as a computer processor 1315 executing program instructions stored in memory 1320, or other suitable electronics such as an application specific integrated circuit, and a set of one or more drivers 1325 such as optical switching cell drivers configured to put the optical device into a desired state. The drivers may be electrical devices configured to generate selectable voltages and/or currents suitable for disposing components of the optical switch into corresponding selectable configurations, for example. In one embodiment, the drivers include a digital-to-analog converter. The apparatus includes an interface 1330 configured to receive indications to optically couple designated input ports to designated output ports in the optical device. The interface may be a digital communication interface, for example. Such indications can be received periodically at certain switching times, for example. The apparatus is configured to determine and implement optical device states in the manner described herein, in response to received indications. The apparatus, particularly its internal logic and modelling parameters, can be customized to the optical device architecture.

The controller 1310 can include various functional components such as a path determiner 1322, a loss evaluator 1324 and a selector 1326. The path determiner can determine a plurality of sets of potential optical paths satisfying requirements received at the interface 1330. At least some of the sets of optical paths can be determined from an initial set of optical paths by re-arranging intermediate planes of an optical switching fabric. The initial set of optical paths can be determined using a non-blocking path determination algorithm. The loss evaluator 1324 can evaluate the loss metric as applied to some or all of the sets of potential optical paths, in order to select, by the selector 1326, one set of paths having an adequately low loss metric.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for operating an optical switching fabric having a plurality of input ports, a plurality of output ports, and a plurality of photonic elements operable to selectably optically couple the input ports to the output ports, the method comprising:
receiving an indication to optically couple each designated one of a set of the input ports to a designated one of a set of the output ports; and
in response to the indication and by operating the photonic elements, implementing an optical switch configuration which establishes a set of optical paths accommodating the indication, the optical switch configuration determined based at least in part on a loss metric which is based on one or both of: a number of waveguide crossings in each of the optical paths; and a length of each of the optical paths.

2. The method of claim 1, wherein the optical switching fabric comprises an input stage, an output stage, and a plurality of intermediate stages, the input stage configured to optically couple selected ones of the input ports to selected ones of the intermediate stages, and the output stage configured to optically couple selected ones of the intermediate stages to selected ones of the output ports.

3. The method of claim 2, wherein the intermediate stages are interchangeable with one another, and wherein determining the optical switch configuration comprises:
establishing a representation of the optical switching fabric, the representation comprising a plurality of logical intermediate stages representative of the plurality of intermediate stages;
determining a switch configuration solution indicative of a set of paths in the representation of the optical switching fabric, the set of paths accommodating the indication; and
obtaining the optical switch configuration from the switch configuration solution by mapping the logical intermediate stages to the intermediate stages, the mapping based at least in part on the loss metric, wherein each one of the intermediate stages is configured in the same manner as a logical intermediate stage which is associated with said one of the intermediate stages via said mapping.

4. The method of claim 2, wherein determining the optical switch configuration comprises:
determining two or more alternative optical switch configurations, each of the alternative optical switch configurations establishing a corresponding set of optical paths accommodating the indication, and the alternative optical switch configurations differing from one another with respect to a re-ordering of the plurality of intermediate stages; and
selecting one of the alternative optical switch configurations based at least in part on the loss metric.

5. The method of claim 2, wherein the optical switch comprises more than two intermediate stages.

6. The method of claim 2, wherein each of the intermediate stages comprises a further plurality of sub-stages in a nested configuration.

7. The method of claim 6, further comprising recursively applying the method to the intermediate stages, the sub-stages, or a combination thereof.

8. The method of claim 1, wherein the optical switch is configured to switchably route optical communications signals or optical signals between components of a computing device.

9. The method of claim 1, wherein the optical switch is a re-arrangably non-blocking optical switch.

10. The method of claim 1, wherein the loss metric is based on numbers of waveguide crossings in each of the optical paths and is independent of said length of each of the optical paths.

11. The method of claim 1, wherein the loss metric is based on one of:
a difference between a maximum value, among all of the optical paths, of a per-path loss metric and a minimum value, among all of the optical paths, of the per-path loss metric;
an amount of variation, among all of the optical paths, of the per-path loss metric;
a maximum value, among all of the optical paths, of the per-path loss metric; and
an average value, among all of the optical paths, of the per-path loss metric, wherein the per-path loss metric is applied to a given optical path and is an increasing function of one or both of: a number of waveguide crossings in the given optical path;
and a length of the given optical path.

12. The method of claim 1, wherein the optical switch configuration is further determined as a non-blocking configuration.

13. An optical switch comprising:
an optical switching fabric having a plurality of input ports, a plurality of output ports, and a plurality of photonic elements operable to selectably optically couple the input ports to the output ports; and
a controller configured to switchably operate the plurality of photonic elements in response to input indicative of a desired state of the optical switch, the controller configured to:
receive an input to optically couple each designated one of a set of the input ports to a designated one of a set of the output ports; and
in response to the indication and by operating the photonic elements, implement an optical switch configuration which establishes a set of optical paths accommodating the indication, the optical switch configuration determined based at least in part on a loss metric which is based on one or both of: a number of waveguide crossings in each of the optical paths; and a length of each of the optical paths.

14. The optical switch of claim 13, wherein the optical switching fabric comprises an input stage, an output stage, and a plurality of intermediate stages, the input stage configured to optically couple selected ones of the input ports to selected ones of the intermediate stages, and the output stage configured to optically couple selected ones of the intermediate stages to selected ones of the output ports,
wherein the intermediate stages are interchangeable with one another, and
wherein determining the optical switch configuration comprises:
establishing a representation of the optical switching fabric, the representation comprising a plurality of logical intermediate stages representative of the plurality of intermediate stages;

determining a switch configuration solution indicative of a set of paths in the representation of the optical switching fabric, the set of paths accommodating the indication; and obtaining the optical switch configuration from the switch configuration solution by mapping the logical intermediate stages to the intermediate stages, the mapping based at least in part on the loss metric, wherein each one of the intermediate stages is configured in the same manner as a logical intermediate stage which is associated with said one of the intermediate stages via said mapping.

15. The optical switch of claim 13, wherein the optical switching fabric comprises an input stage, an output stage, and a plurality of intermediate stages, the input stage configured to optically couple selected ones of the input ports to selected ones of the intermediate stages, and the output stage configured to optically couple selected ones of the intermediate stages to selected ones of the output ports, and wherein determining the optical switch configuration comprises:

determining two or more alternative optical switch configurations, each of the alternative optical switch configurations establishing a corresponding set of optical paths accommodating the indication, and the alternative optical switch configurations differing from one another with respect to a re-ordering of the plurality of intermediate stages; and selecting one of the alternative optical switch configurations based at least in part on the loss metric.

16. The optical switch of claim 13, wherein the loss metric is based on numbers of waveguide crossings in each of the optical paths and is independent of said length of each of the optical paths.

17. The optical switch of claim 13, wherein the loss metric is based on one of:

a difference between a maximum value, among all of the optical paths, of a per-path loss metric and a minimum value, among all of the optical paths, of the per-path loss metric;

an amount of variation, among all of the optical paths, of the per-path loss metric;

a maximum value, among all of the optical paths, of the per-path loss metric; and an average value, among all of the optical paths, of the per-path loss metric, wherein the per-path loss metric is applied to a given optical path and is an increasing function of one or both of: a number of waveguide crossings in the given optical path; and a length of the given optical path.

18. The optical switch of claim 13, wherein the optical switch configuration is further determined as a non-blocking configuration.

19. A method for operating an optical device having a plurality of input ports, a plurality of output ports, and a plurality of elements operable to selectably optically couple the input ports to the output ports, the method comprising:

receiving an indication to optically couple each designated one of a set of the input ports to a designated one of a set of the output ports; and in response to the indication and by operating the elements, implementing an optical device configuration which establishes a set of optical paths accommodating the indication, the optical device configuration determined based at least in part on a loss metric which is based on one or both of: a number of crossings or near crossings in each of the optical paths; and a length of each of the optical paths.

20. The method of claim 19, wherein the optical device is an optical switch having a plurality of switching cells, or a wavelength selective switch.

21. An optical device comprising:

an optical path component having a plurality of input ports, a plurality of output ports, and a plurality of elements operable to selectably optically couple the input ports to the output ports; and a controller configured to switchably operate the plurality of elements in response to input indicative of a desired state of the optical path component, the controller configured to:

receive an input to optically couple each designated one of a set of the input ports to a designated one of a set of the output ports; and in response to the indication and by operating the elements, implement an optical path component configuration which establishes a set of optical paths accommodating the indication, the optical path component configuration determined based at least in part on a loss metric which is based on one or both of: a number of crossings or near crossings in each of the optical paths; and a length of each of the optical paths.

22. The optical device of claim 21, wherein the optical device is an optical switch having a plurality of switching cells, or a wavelength selective switch.

* * * * *